(12) United States Patent
Osada

(10) Patent No.: US 8,351,226 B2
(45) Date of Patent: Jan. 8, 2013

(54) RECTIFIER CIRCUIT, SEMICONDUCTOR DEVICE USING THE RECTIFIER CIRCUIT, AND DRIVING METHOD THEREOF

(75) Inventor: Takeshi Osada, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 770 days.

(21) Appl. No.: 11/905,699

(22) Filed: Oct. 3, 2007

(65) Prior Publication Data

US 2008/0083969 A1  Apr. 10, 2008

(30) Foreign Application Priority Data

Oct. 6, 2006 (JP) ................... 2006-274567

(51) Int. Cl.
  *H02H 7/125* (2006.01)
  *H02M 1/12* (2006.01)
(52) U.S. Cl. ......................... 363/52; 363/44
(58) Field of Classification Search ............... 363/21.06, 363/21.14, 37, 44, 52, 53, 125
  See application file for complete search history.

(56) References Cited

U.S. PATENT DOCUMENTS

| | | | |
|---|---|---|---|
| 4,398,120 A * | 8/1983 | Guillon | 315/1 |
| 4,841,227 A * | 6/1989 | Maier | 73/304 C |
| 5,173,835 A | 12/1992 | Cornett et al. | |
| 5,283,462 A | 2/1994 | Stengel | |
| 5,483,207 A | 1/1996 | Gabara | |
| 6,118,148 A | 9/2000 | Yamazaki | |
| 6,493,275 B2 | 12/2002 | Tomita | |
| 6,621,467 B1 * | 9/2003 | Marsh | 343/850 |
| 6,777,829 B2 | 8/2004 | Devilbiss et al. | |
| 6,778,023 B2 * | 8/2004 | Christensen | 331/16 |
| 6,809,952 B2 | 10/2004 | Masui | |
| 7,009,884 B2 | 3/2006 | Yaoi et al. | |
| 7,109,934 B2 | 9/2006 | Devilbiss et al. | |
| 7,224,241 B2 * | 5/2007 | Jue | 333/32 |
| 2004/0056725 A1 | 3/2004 | Kitamura et al. | |
| 2004/0145034 A1 | 7/2004 | Fujioka et al. | |
| 2004/0212741 A1 | 10/2004 | Hijikata et al. | |
| 2004/0245858 A1 | 12/2004 | Devilbiss et al. | |
| 2005/0133790 A1 | 6/2005 | Kato | |
| 2005/0146006 A1 | 7/2005 | Yamazaki et al. | |
| 2005/0210302 A1 | 9/2005 | Kato et al. | |

(Continued)

FOREIGN PATENT DOCUMENTS

EP  0720185  7/1996

(Continued)

*Primary Examiner* — Adolf Berhane
*Assistant Examiner* — Emily Pham
(74) *Attorney, Agent, or Firm* — Eric J. Robinson; Robinson Intellectual Property Law Office, P.C.

(57) ABSTRACT

An object of the present invention is to provide a rectifier circuit which can suppress loss of power due to parasitic capacitance or parasitic inductance of a semiconductor element. The rectifier circuit matches or mismatches impedance between a circuit of a previous stage and the rectifier circuit in accordance with the amplitude of an input AC voltage. When an AC voltage to be input has a smaller amplitude than a predetermined voltage, impedance is matched and the AC voltage is applied as is to the rectifier circuit. Conversely, when an AC voltage to be input has a larger amplitude than a predetermined voltage, impedance is mismatched, and the amplitude of the AC voltage is decreased by reflection and then the AC voltage is applied to the rectifier circuit.

33 Claims, 19 Drawing Sheets

U.S. PATENT DOCUMENTS

| | | |
|---|---|---|
| 2006/0094425 A1* | 5/2006 | Mickle et al. .............. 455/434 |
| 2006/0192019 A1 | 8/2006 | Kato et al. |
| 2009/0057416 A1 | 3/2009 | Kato |

FOREIGN PATENT DOCUMENTS

| | | |
|---|---|---|
| JP | 05-218304 | 8/1993 |
| JP | 06-090186 | 3/1994 |
| JP | 06-090186 A | 3/1994 |
| JP | 07-500457 | 1/1995 |
| JP | 08-256015 | 10/1996 |
| JP | 11-133860 | 5/1999 |
| JP | 2002-176141 | 6/2002 |
| JP | 2004-120728 | 4/2004 |
| JP | 2004-228989 | 8/2004 |
| JP | 2004-282506 | 10/2004 |
| JP | 2005-520428 | 7/2005 |
| JP | 2005-322899 | 11/2005 |
| WO | WO-93/08578 | 4/1993 |
| WO | WO-03/079524 | 9/2003 |
| WO | WO-2005/098955 | 10/2005 |
| WO | WO-2006/129742 | 12/2006 |

* cited by examiner

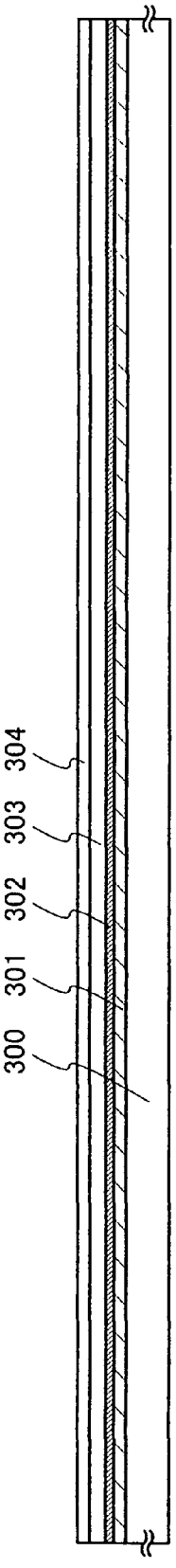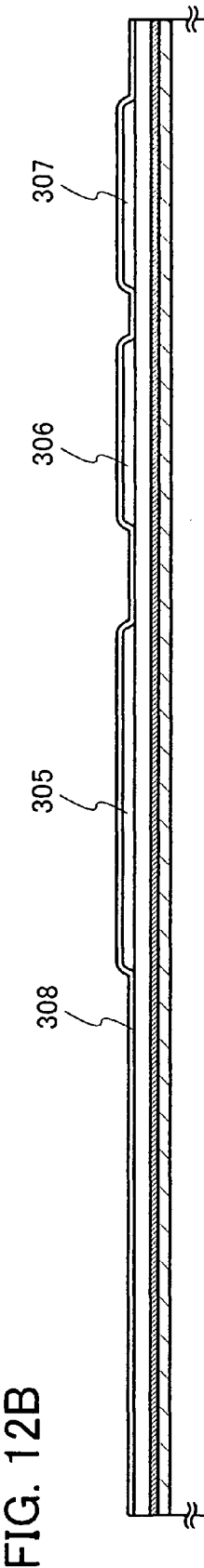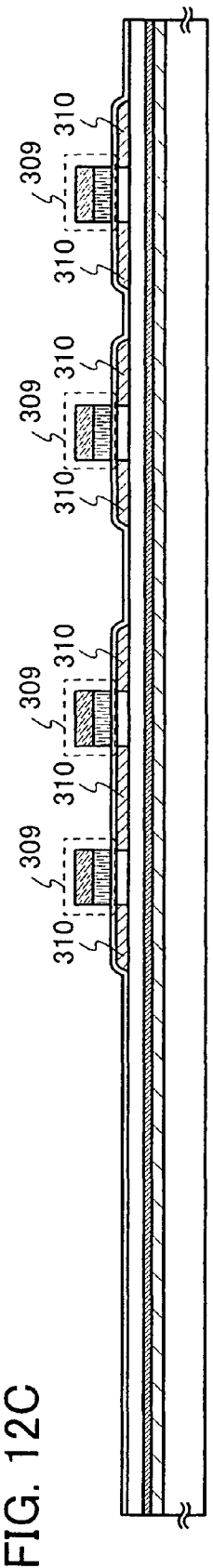

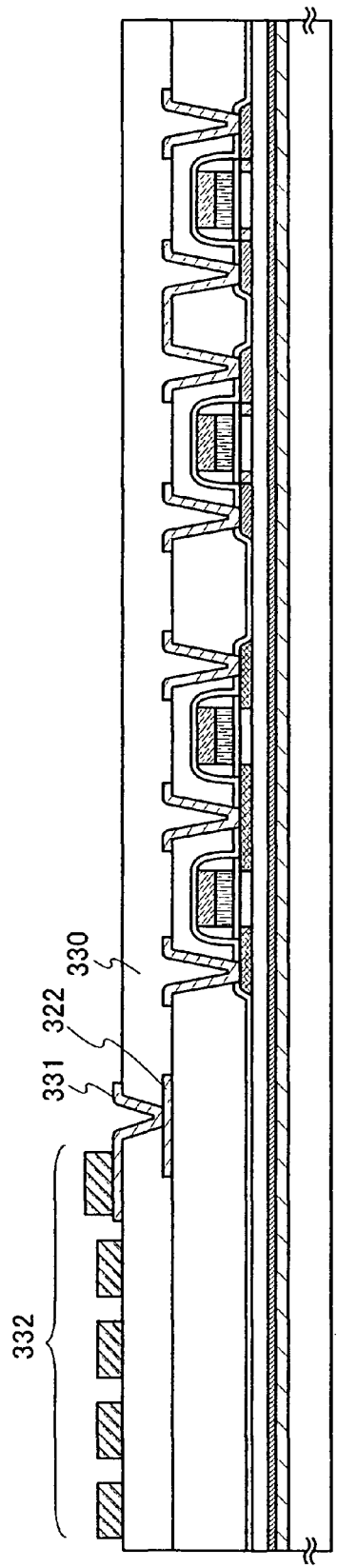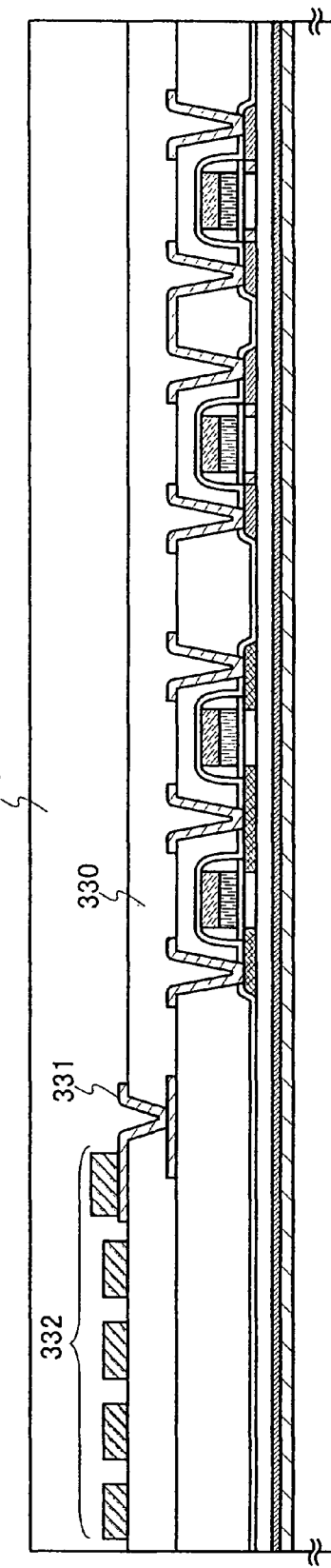

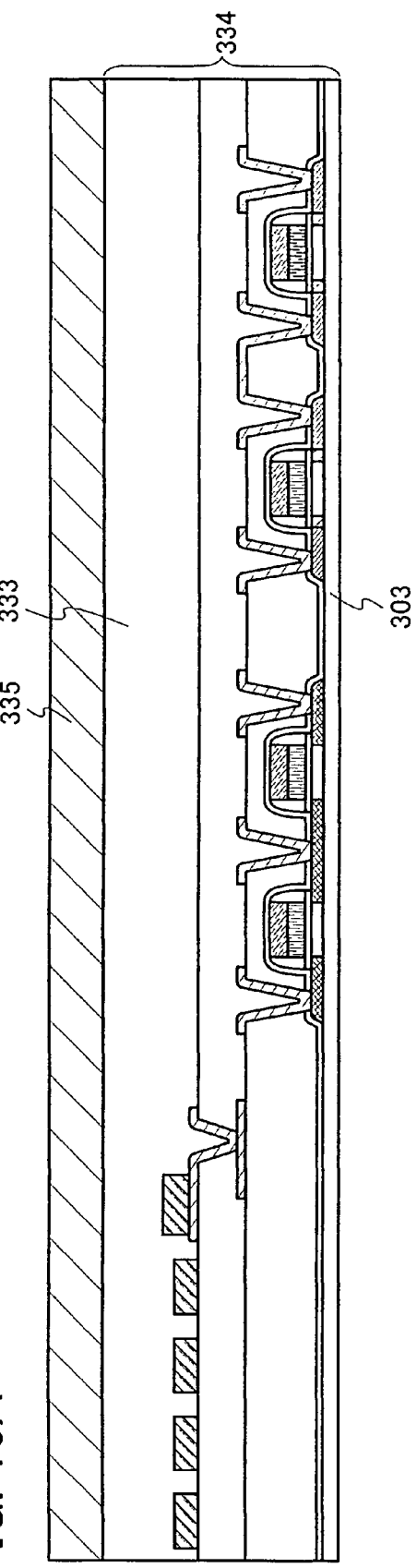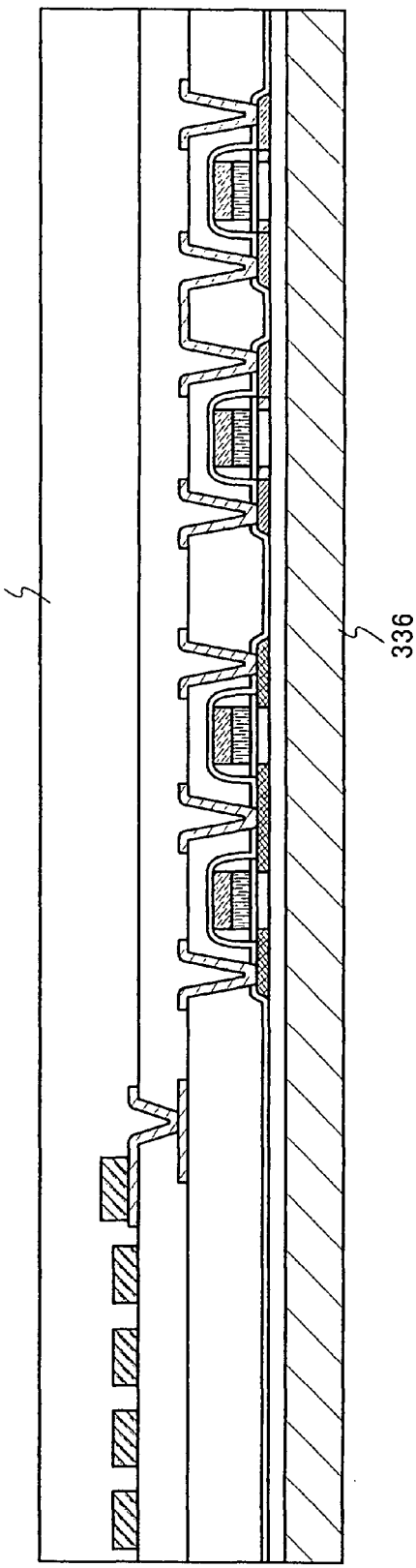
FIG. 15A
FIG. 15B

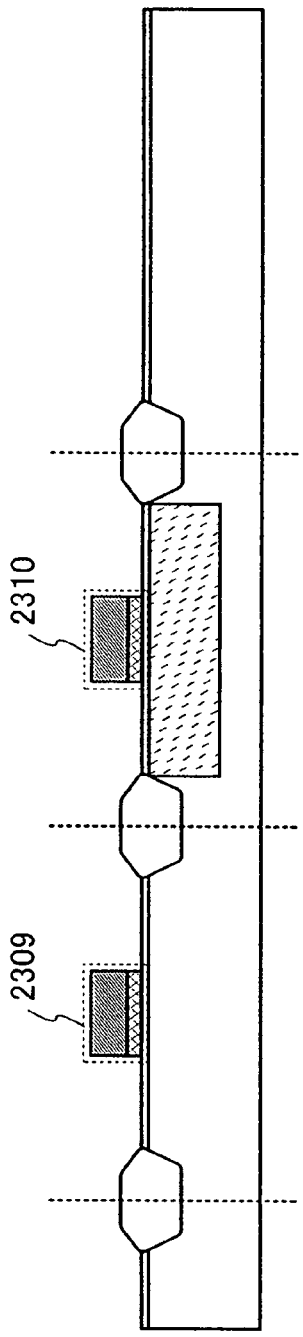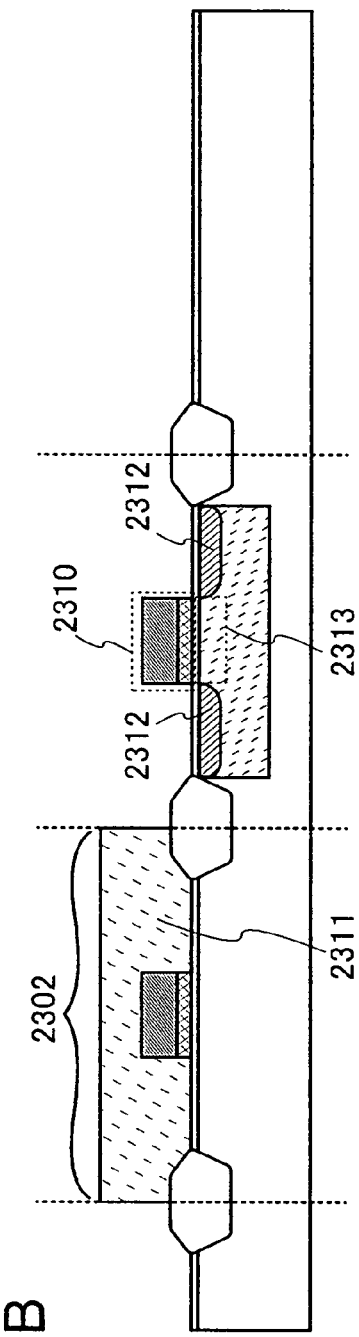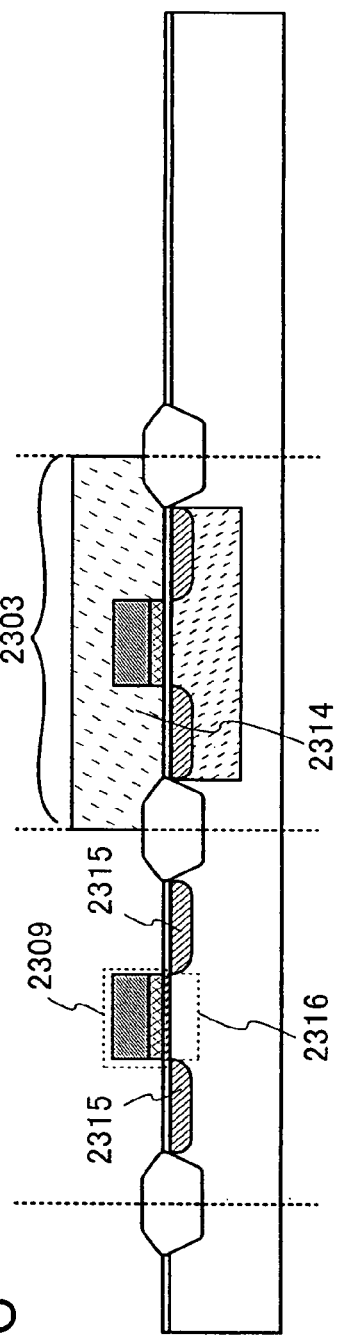

RECTIFIER CIRCUIT, SEMICONDUCTOR DEVICE USING THE RECTIFIER CIRCUIT, AND DRIVING METHOD THEREOF

BACKGROUND OF THE INVENTION

1. Field of the Invention

The present invention relates to a rectifier circuit having a function as a limiter. Further, the present invention relates to a semiconductor device which can communicate wirelessly with a voltage rectified by the rectifier circuit, and a driving method thereof.

2. Description of the Related Art

Technology by which a signal is transmitted and received without contact between media (tags) each incorporating an integrated circuit and an antenna (RFID: Radio Frequency Identification) has been put to practical use in various fields and has been anticipated to further expand the market as a new mode of information communication. As the shape of a tag used for an RFID, a card shape or a chip shape which is smaller than such a card shape are adopted in many cases; however, various shapes can be adopted in accordance with an application.

As for RFID, communication between a tag and a reader can be realized with a radio wave. Specifically, a radio wave generated from a reader is converted into an electric signal by an antenna in a tag, and an integrated circuit in the tag is operated in accordance with the electric signal. Then, the radio wave modulated in accordance with the electric signal output from the integrated circuit is output from the antenna, and thus a signal can be transmitted to the reader without contact.

It is to be noted that tags can be broadly categorized into two types: active tags and passive tags. An active tag incorporates a primary battery and does not generate electric energy in the tag.

Meanwhile, a passive tag can generate electric energy in the tag with the use of a radio wave from a reader. Specifically, after a radio wave received from the reader is converted into an AC voltage by an antenna, the AC voltage is rectified by a rectifier circuit and then supplied to each circuit in the tag. Therefore, since energy of a radio wave which can be received by the antenna is higher, higher electric energy can be generated. However, a prescribed intensity of a radio wave to be generated from a reader is set accordingly and thus, electric energy to be generated in a tag can generally be in a predetermined range.

However, when a radio wave from a reader includes a noise or unnecessary radiation is emitted from an electronic device other than the reader, the tag might be exposed to an intense radio wave which exceeds a predetermined level. In that case, such an excessively high AC voltage that deviates from a predetermined range is generated in an antenna. Accordingly, the value of a current to be supplied to a semiconductor element in an integrated circuit might be drastically raised, which results in destroying or deteriorating the integrated circuit due to dielectric breakdown.

In particular, in a case where communication is performed with the use of a radio wave with high frequency in order to extend a communication distance, a semiconductor element included in an integrated circuit tends to be miniaturized so that the integrated circuit can be operated more rapidly. However, when the semiconductor element is miniaturized, a withstand voltage becomes lower, and further, a tag is easily damaged due to an excess current.

In addition, when intensity of a radio wave in a case where a communication distance between a tag and a reader is short and that in a case where the communication distance between the tag and the reader is long are the same, electric energy generated in a tag increases as a communication distance between a tag and a reader shortens. Therefore, when the communication distance is short, excess electric energy might be generated.

It is very effective to provide a limiter having a function of discharging excess electric energy in an integrated circuit in order to improve reliability of a tag. A limiter has a function of controlling a voltage to be output to be lower than or equal to a set voltage (limit voltage) regardless of an input voltage. With such a limiter, the above-described deterioration or destruction of a semiconductor element due to an excess current is prevented.

In a case of a tag, a circuit of a semiconductor element which is most easily deteriorated or destroyed is a circuit to which an AC voltage is directly input from an antenna. A rectifier circuit is one of such a circuit, and a rectifier circuit provided with a diode functioning as a limiter on an input side is described in Patent Document 1: Japanese Published Patent Application No. 2002-176141 (FIG. 1 in the page 6).

However, in a case where a limiter is provided between an antenna and a rectifier circuit, there is a problem in that the rectifier circuit is short-circuited with a ground (GND) side due to parasitic capacitance or parasitic inductance in the limiter and power is consumed by the limiter even when excess current is not generated.

FIG. 19A shows a general structure of an antenna 1901, a limiter 1902, and a rectifier circuit 1903. The limiter 1902 and the rectifier circuit 1903 correspond to part of an integrated circuit, and the limiter 1902 is connected to a terminal A1 and a terminal A2 of the antenna 1901. In addition, the rectifier circuit 1903 is connected to a next stage of the limiter 1902.

FIG. 19B shows an equivalent circuit diagram of the antenna 1901, the limiter 1902, and the rectifier circuit 1903 which are shown in FIG. 19A. Note that FIG. 19B shows a circuit diagram in a state where the terminal A2 is connected to GND. The antenna 1901 includes an inductor 1910 and a resonant capacitor 1911 which are connected in parallel. The limiter 1902 includes a switch 1912 which controls connection between the terminal A1 and the terminal A2. In addition, the rectifier circuit 1903 is connected to the terminal A1 and the terminal A2 in the next stage of the limiter 1902.

When a voltage lower than a prescribed voltage is applied between the terminal A1 and the terminal A2, the switch 1912 is opened and the voltage between the terminal A1 and the terminal A2 is applied to the rectifier circuit 1903 as is. Conversely, when a voltage with a larger amplitude than a predetermined voltage is applied between the terminal A1 and the terminal A2, the switch 1912 is short-circuited and thus an excess current flows to the terminal A2 (GND) side, so that a voltage to be applied to the rectifier circuit 1903 can be suppressed.

Incidentally, since the switch 1912 is generally formed using a semiconductor element such as a transistor or a diode, it includes parasitic capacitance or parasitic inductance. Therefore, when an AC voltage with high frequency is applied between the terminal A1 and the terminal A2, the AC voltage is applied to the terminal A2 side as well due to parasitic capacitance or parasitic inductance and thus power is lost even if the switch 1912 is open. The current situation is that an excess loss of power is desirably minimized because electric energy which can be generated in a tag is limited.

SUMMARY OF THE INVENTION

In view of the above problems, an object of the present invention is to provide a rectifier circuit which can suppress loss of power due to parasitic capacitance or parasitic inductance of a semiconductor element. Further, the present invention relates to a semiconductor device which can communicate wirelessly with a voltage rectified by the rectifier circuit and a driving method thereof.

The rectifier circuit of the present invention matches or mismatches impedance between a circuit of a previous stage and the rectifier circuit in accordance with the amplitude of an input AC voltage. When an AC voltage to be input has an amplitude smaller than or equal to a predetermined level, impedance is matched and the AC voltage is applied as is to the rectifier circuit. Conversely, when an AC voltage to be input has an amplitude larger than or equal to a predetermined level, impedance is mismatched, and the amplitude of the AC voltage is decreased by reflection and then the AC voltage is applied to the rectifier circuit.

In the present invention, a variable capacitor is provided in the rectifier circuit and input impedance of the rectifier circuit is adjusted with the use of the variable capacitor. Specifically, a capacitance value of the variable capacitor is changed in accordance with the amplitude of an AC voltage to be input to the rectifier circuit. In addition, reactance corresponding to an imaginary part of input impedance of the rectifier circuit is changed in accordance with the capacitance value of the variable capacitor. Therefore, impedance between the rectifier circuit and the circuit of the previous stage can be matched or mismatched by changing the capacitance value of the variable capacitor in accordance with the amplitude of an AC voltage.

The mismatched impedance can be realized by setting input impedance of the rectifier circuit to be higher than output impedance of the circuit of the previous stage or, conversely, by setting input impedance of the rectifier circuit to be lower than output impedance of the circuit of the previous stage.

In addition, the semiconductor device of the present invention matches or mismatches impedance between an antenna and the rectifier circuit in accordance with the amplitude of an AC voltage generated in the antenna. When an AC voltage generated in the antenna has an amplitude smaller than or equal to a prescribed level, impedance is matched and the AC voltage is applied as is to the rectifier circuit. Conversely, when an AC voltage generated in the antenna has an amplitude larger than or equal to a predetermined level, impedance is mismatched, and the amplitude of the AC voltage is decreased by reflection and then the AC voltage is applied to the rectifier circuit.

In the semiconductor device of the present invention, a variable capacitor is provided in the rectifier circuit. Reactance corresponding to an imaginary part of input impedance of the rectifier circuit is determined depending on a capacitance value of the variable capacitor. Therefore, the match or the mismatch of impedance can be selected by changing the capacitance value of the variable capacitor in accordance with the amplitude of an AC voltage. Impedance can be mismatched by setting input impedance of the rectifier circuit to be higher than output impedance of the antenna or, conversely, setting input impedance of the rectifier circuit to be lower than output impedance of the antenna.

The variable capacitor has at least two electrodes. In addition, the antenna has at least two terminals. The variable capacitor is connected in the rectifier circuit so that an AC voltage to be supplied from one of the two terminals of the antenna is applied to one of the two electrodes of the variable capacitor.

Note that it is only necessary that the semiconductor device of the present invention includes at least an integrated circuit, and an antenna is not necessarily included in the semiconductor device. The integrated circuit included in the semiconductor device of the present invention may include a rectifier circuit which rectifies an AC voltage generated by the antenna to generate a DC power source voltage, an arithmetic circuit which operates with the power source voltage, and a modulation circuit for modulating a radio wave with the use of a signal generated from the arithmetic circuit.

The rectifier circuit of the present invention has a function of a limiter; therefore, deterioration or destruction of a semiconductor element due to an excess current can be prevented even when a limiter is not provided in the previous stage of the rectifier circuit, unlike the conventional method.

In addition, a situation in which consumption of power as a result of a semiconductor element functioning as a switch of a limiter that short-circuits with a ground (GND) side through pre-existing parasitic capacitance and parasitic inductance can be avoided, even in the case that a semiconductor device is not subjected to an excess radio wave. According to the present invention, by purposely using reflection caused by a mismatch of impedance, the amplitude of an AC voltage generated in an antenna can be suppressed to be small; therefore, deterioration or destruction of the semiconductor element in a rectifier circuit due to excess current can be prevented, and reliability of the semiconductor device can be improved. Further, by suppressing loss of power in the semiconductor device, it is possible that the semiconductor device be highly-functional and a communication distance can be extended.

BRIEF DESCRIPTION OF DRAWINGS

FIGS. 12A to 12C are diagrams showing a method for manufacturing a semiconductor device of the present invention.

FIGS. 14A and 14B are diagrams showing a method for manufacturing a semiconductor device of the present invention.

FIGS. 15A and 15B are diagrams showing a method for manufacturing a semiconductor device of the present invention.

FIGS. 17A to 17C are diagrams showing a method for manufacturing a semiconductor device of the present invention.

DETAILED DESCRIPTION OF THE INVENTION

Although the present invention will be fully described by way of embodiment modes and embodiments with reference to the accompanying drawings, it is to be understood by those skilled in the art that various changes and modifications can be made without departing from the spirit and scope of the present invention. Therefore, the present invention should not be construed as being limited to the description in the following embodiment modes and embodiments.

Embodiment Mode 1

Figure 1A:
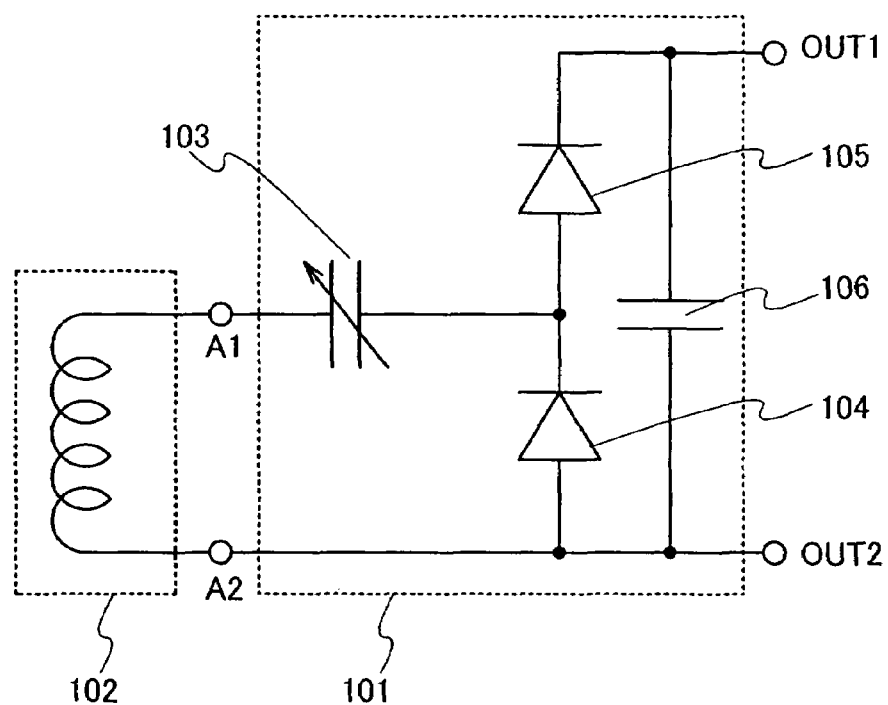
FIGS. 1A and 1B are circuit diagrams each showing a structure of a rectifier circuit of the present invention.

A structure of a rectifier circuit of the present invention is described with reference to FIGS. 1A and 1B. In FIG. 1A, a rectifier circuit 101 is connected to a terminal A1 and a terminal A2 of an antenna 102, and the terminal A1 and the terminal A2 of the antenna 102 function as input terminals of the rectifier circuit 101. Note that FIG. 1A shows a case where the antenna 102 has a coil shape; however, the shape of the antenna used in the present invention is not limited to this. When communication is performed using an electric field instead of a magnetic field, the antenna 102 does not necessarily have a coil shape.

The rectifier circuit 101 includes a variable capacitor 103, a diode 104 and a diode 105 which are for rectifying an AC voltage applied between the terminal A1 and the terminal A2, and a smoothing capacitor 106 for smoothing the rectified voltage. The variable capacitor 103 has at least two electrodes. The capacitance value of the variable capacitor 103 changes in accordance with the value of a voltage applied between the electrodes, that is, a first electrode and a second electrode. In this embodiment mode, a variable-capacitance diode is used as the variable capacitor 103.

The smoothing capacitor 106 is connected between an output terminal OUT1 and an output terminal OUT2 of the rectifier circuit 101. In the rectifier circuit shown in FIG. 1A, the smoothing capacitor 106 is used for smoothing the rectified voltage; however, the smoothing capacitor 106 is not necessarily provided. Note that, by using the smoothing capacitor 106, a component other than a DC component in the rectified voltage, such as ripple, can be reduced.

The number and connection of diodes included in the rectifier circuit 101 are not limited to the structure shown in FIG. 1A. In the rectifier circuit 101 of the present invention, at least two diodes 104 and 105 are connected in series so that forward directions of the diodes are the same. In addition, one of the diodes 104 and 105 is connected in series between the second electrode of the variable capacitor 103 and the output terminal OUT1 of the rectifier circuit 101, and the other is connected in series between the second electrode of the variable capacitor 103 and the output terminal OUT2 of the rectifier circuit 101.

Specifically, in the rectifier circuit 101 shown in FIG. 1A, the first electrode of the variable capacitor 103 is connected to the terminal A1. The second electrode of the variable capacitor 103 is connected to a second electrode (cathode) of the diode 104 and a first electrode (anode) of the diode 105. A first electrode (anode) of the diode 104 is connected to the terminal A2 and the output terminal OUT2. A second electrode (cathode) of the diode 105 is connected to the output terminal OUT1. A first electrode of the smoothing capacitor 106 is connected to the output terminal OUT1, and a second electrode of the smoothing capacitor 106 is connected to the output terminal OUT2.

Figure 1B:
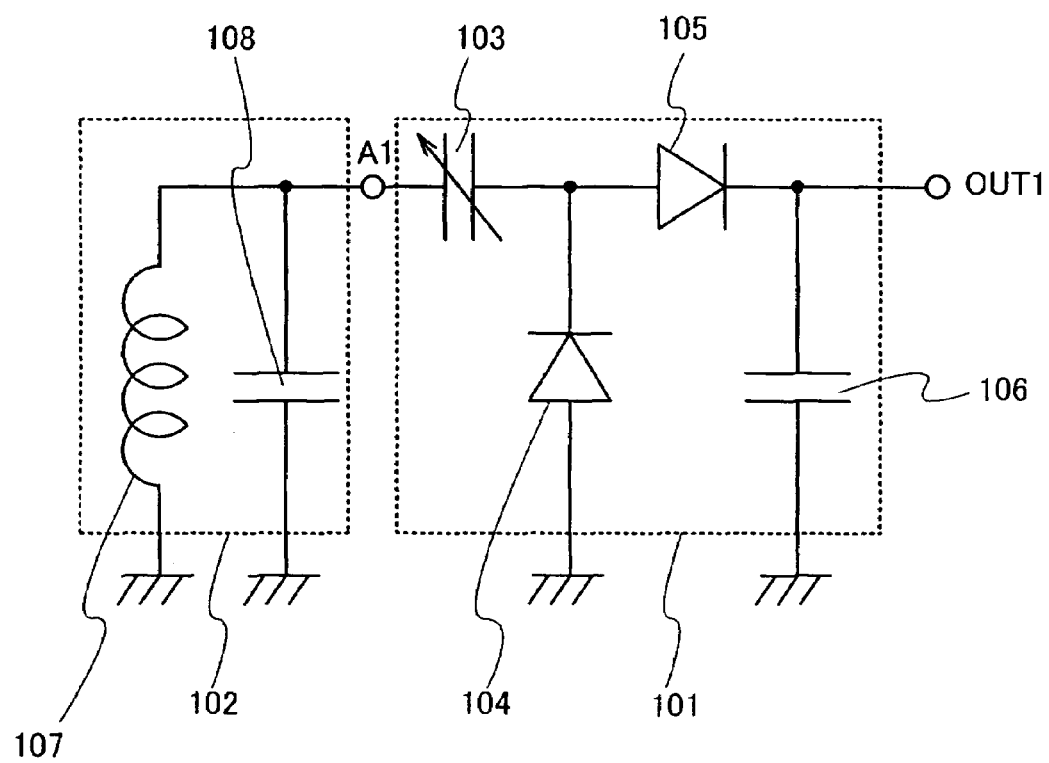

FIG. 1B shows an equivalent circuit diagram of the rectifier circuit 101 and the antenna 102, which are shown in FIG. 1A, in a case where the terminal A2 is connected to ground (GND).

The antenna 102 has an inductor 107 and a resonant capacitor 108. The inductor 107 has at least two terminals and one of the terminals is connected to the terminal A1 and the other is connected to GND. In addition, the resonant capacitor 108 has at least two electrodes and one of the electrodes is connected to the terminal A1 and the other is connected to GND. Thus, the inductor 107 and the resonant capacitor 108 are connected in parallel, so that a parallel resonant circuit is formed in the antenna 102.

Further, in FIG. 1B, the first electrode of the diode 104 is connected to GND. The second electrode of the smoothing capacitor 106 is connected to GND.

When the antenna 102 is subjected to a radio wave having a wavelength within a specific range, an AC electromotive force is generated in the antenna 102, and then an AC voltage is applied between the terminal A1 and the terminal A2.

When a voltage Vh which is higher than that of the terminal A2 is applied to the terminal A1, the voltage Vh is fed to the first electrode of the variable capacitor 103. Then, a negative charge is accumulated on the second electrode side of the variable capacitor 103; therefore, a voltage of the second electrode of the variable capacitor 103 becomes lower than that of the terminal A2 (GND in this case). Then, the diode 104 is turned on, so that the voltage of the terminal A2 (GND in this case) is fed to the second electrode of the variable capacitor 103. Next, when a voltage Vl (=−Vh) which is lower than that of the terminal A2 is applied to the terminal A1, the voltage Vl is fed to the first electrode of the variable capacitor 103. Here, a charge accumulated in the variable capacitor 103 is held; therefore, the voltage of the second electrode of the variable capacitor 103 becomes twice as high as the voltage Vh. Then, the diode 104 is turned off and the diode 105 is turned on, and the voltage which is twice as high as the voltage Vh is fed to the output terminal OUT1.

Note that a capacitance value of the variable capacitor 103 is changed in accordance with the value of a voltage applied to the first electrode. Input impedance of the rectifier circuit 101 can be changed in accordance with a capacitance value of the variable capacitor 103. Therefore, the relation between a voltage applied to the first electrode of the variable capacitor 103 and the capacitance value thereof is set in advance during the design stage. That is, in a case where the value of a voltage applied to the first electrode of the variable capacitor 103 is within a predetermined range, characteristics of the variable capacitor 103 are predetermined so that impedance can be matched between the rectifier circuit 101 and the antenna 102. In a case where a voltage with a large amplitude which exceeds a predetermined range is applied to the first electrode of the variable capacitor 103, characteristics of the variable capacitor 103 are predetermined so that impedance is mismatched between the rectifier circuit 101 and the antenna 102.

In a case of the rectifier circuit 101 shown in FIG. 1A, when a voltage within a predetermined range is applied to the first electrode of the variable capacitor 103, impedance is matched between the rectifier circuit 101 and the antenna 102. In addition, an AC voltage applied to the first electrode of the variable capacitor 103 is applied to a semiconductor element of a next stage of the variable capacitor 103. Specifically, the AC voltage is applied to the second electrode of the diode 104 and the first electrode of the diode 105.

Meanwhile, in a case of the rectifier circuit 101 shown in FIG. 1B, when a voltage with a large amplitude which exceeds a predetermined range is applied to the first electrode of the variable capacitor 103, the capacitance value of the variable capacitor 103 becomes small. In a case of the variable capacitor 103 connected in series between the terminal A1 corresponding to the input terminal and the output terminal OUT1 of the rectifier circuit 101, if ω, C, and j are an angular frequency, a capacitance value, and an imaginary unit respectively, impedance Z is expressed by $1/(j\omega C)$. Therefore, as a capacitance value of the variable capacitor 103 is reduced, input impedance of the rectifier circuit 101 is increased, so that impedance can be mismatched between the rectifier circuit 101 and the antenna 102. Consequently, the amplitude of the AC voltage applied to the first electrode is suppressed by reflection, and the AC voltage is applied to the semiconductor element of the next stage of the variable capacitor 103. Specifically, the AC voltage is applied to the second electrode of the diode 104 and the first electrode of the diode 105.

Note that a designer may appropriately determine a range of matching and mismatching in accordance with the value of a voltage reduced due to reflection. For example, by comparing the amplitude of an AC voltage generated in the antenna 102 with the amplitude of an AC voltage actually input to the rectifier circuit 101, it can be determined that when reduction in the voltage is less than 3%, impedance is matched, and when reduction in the voltage is more than or equal to 10%, impedance is mismatched.

Note that in an actual design, characteristic impedance of a wiring is also considered, so that it is possible to form a rectifier circuit having suitable characteristics which are based on the design.

The rectifier circuit of this embodiment mode includes a variable capacitor and is structured so that a capacitance value of the variable capacitor is changed in accordance with an input voltage. The change in a capacitance value of the variable capacitor operates so that input impedance of the rectifier circuit is changed and an input signal is reflected. By this operation, an excess AC voltage is applied to the rectifier circuit, so that a semiconductor element in the rectifier circuit can be prevented from being deteriorated or destroyed due to an excessive current.

Note that communication between a reader and a semiconductor device provided with such a rectifier circuit is performed by modulating a reflected wave of a carrier wave transmitted from the reader. The carrier wave in this communication is sufficiently larger than reflected power for suppressing the amplitude of an AC voltage to be input to the rectifier circuit. Therefore, it is advantageous that transmission of a signal is not easily disturbed even when impedance is mismatched between an antenna and the rectifier circuit on purpose.

Thus, the rectifier circuit of the present invention has a characteristic of changing input impedance so that an excessive AC voltage is not input. Therefore, a semiconductor element such as the diode 104, the diode 105, or the smoothing capacitor 106 in the rectifier circuit 101 can be prevented from being deteriorated or destroyed due to an excessive current. In addition, since a limiter is not necessarily provided for a previous stage of the rectifier circuit unlike in the conventional method, it can be avoided that a limiter is short-circuited with a ground (GND) side through parasitic capacitance and parasitic inductance of the limiter, which thus causes a consumption of power.

Note that the kind and the number of semiconductor elements used in the rectifier circuit 101 are not limited to the structure described in this embodiment mode. In order to obtain a more ideal rectifying characteristic, a resistor, a capacitor, a diode, an inductor, a switch, or the like may be provided in addition to the semiconductor elements shown in FIG. 1A, as appropriate.

Embodiment Mode 2

Figure 2A:
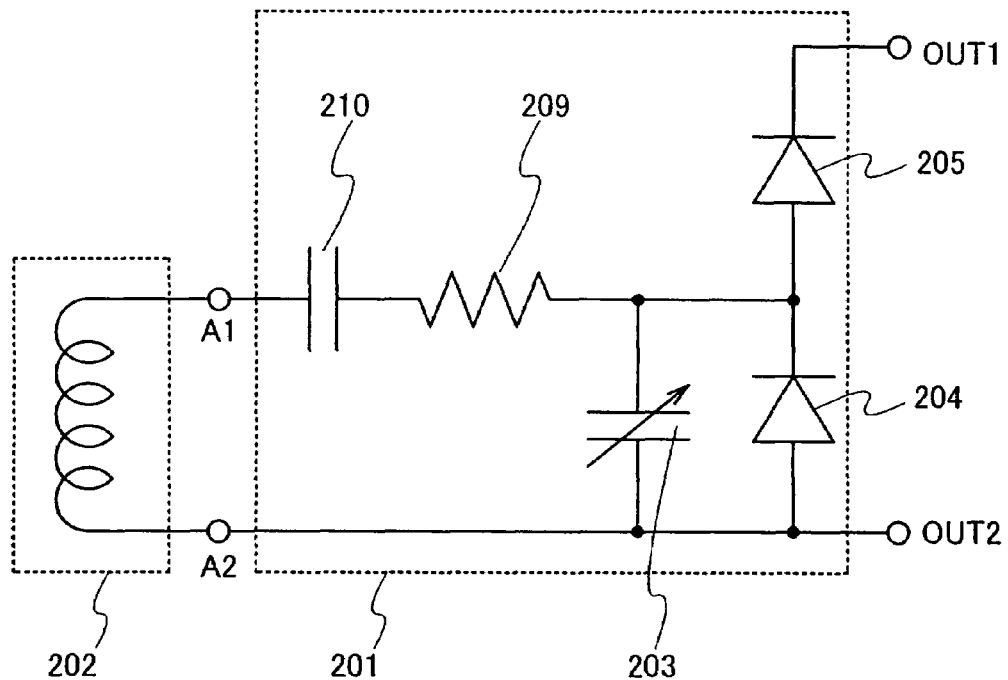
FIGS. 2A and 2B are circuit diagrams each showing a structure of a rectifier circuit of the present invention.

A structure of the rectifier circuit of the present invention is described with reference to FIGS. 2A and 2B. In FIG. 2A, a rectifier circuit 201 is connected to a terminal A1 and a terminal A2 of an antenna 202, and the terminal A1 and the terminal A2 of the antenna 202 function as input terminals of the rectifier circuit 201. Note that FIG. 2A shows a case where the antenna 202 has a coil shape; however, the shape of the antenna used in the present invention is not limited to this. When communication is performed using an electric field instead of a magnetic field, the antenna 202 does not necessarily have a coil shape.

The rectifier circuit 201 includes a variable capacitor 203, a diode 204 and a diode 205 which are for rectifying an AC voltage applied between the terminal A1 and the terminal A2, a resistor 209 functioning as a low-pass filter, and a capacitor 210 for making a voltage output from the rectifier circuit twice as high as the voltage. The variable capacitor 203 has at least two electrodes. A capacitance value of the variable capacitor 203 is changed in accordance with the value of a voltage applied between a first electrode and a second electrode. In this embodiment mode, a variable-capacitance diode is used as the variable capacitor 203.

The number and connection of diodes included in the rectifier circuit 201 are not limited to the structure shown in FIG. 2A. In the rectifier circuit 201 of the present invention, at least two diodes 204 and 205 are connected in series so that forward directions of the diodes are the same. Diode 204 is connected in series between a second electrode of the capacitor 210 and the output terminal OUT1 of the rectifier circuit 201, and diode 205 is connected in series between the second electrode of the capacitor 210 and the output terminal OUT2 of the rectifier circuit 201.

Specifically, in the rectifier circuit 201 shown in FIG. 2A, a first electrode of the capacitor 210 is connected to the terminal A1. The second electrode of the capacitor 210 is connected to a first terminal of the resistor 209. A second terminal of the resistor 209 is connected to a first electrode of the variable capacitor 203, a second electrode (cathode) of the diode 204, and a first electrode (anode) of the diode 205. The second electrode of the variable capacitor 203 and a first electrode (anode) of the diode 204 are connected to the terminal A2 and the output terminal OUT2. A second electrode (cathode) of the diode 205 is connected to the output terminal OUT1.

Figure 2B:
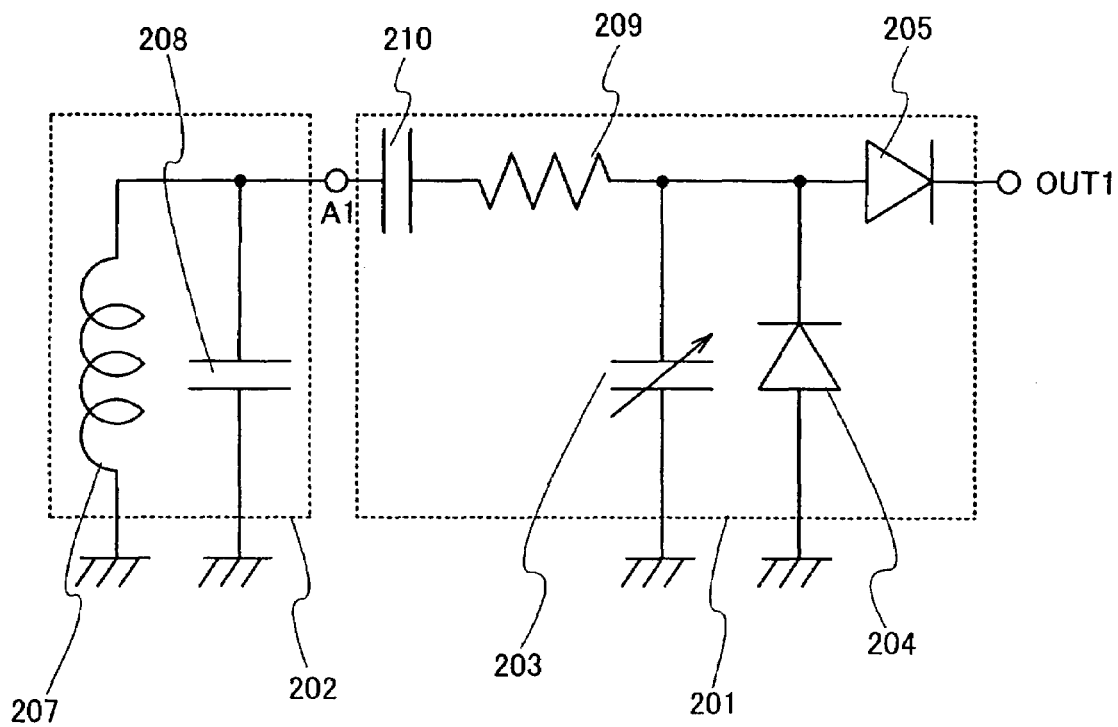

FIG. 2B shows an equivalent circuit diagram of the rectifier circuit 201 and the antenna 202, which is shown in FIG. 2A, in a case where the terminal A2 is connected to ground (GND).

The antenna 202 has an inductor 207 and a resonant capacitor 208. The inductor 207 has at least two terminals and one of the terminals is connected to the terminal A1 and the other is connected to GND. The resonant capacitor 208 has at least two electrodes and one of the electrodes is connected to the terminal A1 and the other is connected to GND. Thus, the inductor 207 and the resonant capacitor 208 are connected in parallel, so that a parallel resonant circuit is formed in the antenna 202.

Further, in FIG. 2B, the first electrode of the diode 204 is connected to GND. The second electrode of the capacitor 203 is connected to GND.

When the antenna 202 is subjected to a radio wave having a wavelength within a specific range, an AC electromotive force is generated in the antenna 202, and then an AC voltage is applied between the terminal A1 and the terminal A2.

When a voltage Vh which is higher than that of the terminal A2 is applied to the terminal A1, the voltage Vh is fed to the first electrode of the capacitor 210. Then, a negative charge is accumulated on the second electrode side of the capacitor 210; therefore, the voltage of the second electrode of the capacitor 210 becomes lower than that of the terminal A2 (GND in this case). Then, the diode 204 is turned on, so that the voltage of the terminal A2 (GND in this case) is fed to the second electrode of the capacitor 210. Next, when a voltage Vl (=−Vh) which is lower than that of the terminal A2 is applied to the terminal A1, the voltage Vl is fed to the first electrode of the capacitor 210. Here, a charge accumulated in the capacitor 210 is held; therefore, the voltage of the second electrode of the capacitor 210 becomes twice as high as the voltage Vh. Then, the diode 204 is turned off and the diode 205 is tuned on, and a voltage which is twice as high as the voltage Vh is fed to the output terminal OUT1.

A capacitance value of the variable capacitor 203 is changed in accordance with a value of a voltage applied to the first electrode. Input impedance of the rectifier circuit 201 can be changed in accordance with a capacitance value of the variable capacitor 203. Therefore, the relation between a voltage applied to the first electrode of the variable capacitor 203 and a capacitance value thereof is set in advance in a stage of designing. That is, in a case where the value of a voltage applied to the first electrode of the variable capacitor 203 is within a predetermined range, characteristics of the variable capacitor 203 are predetermined so that impedance can be matched between the rectifier circuit 201 and the antenna 202. In a case where a voltage with a large amplitude which exceeds a predetermined range is applied to the first electrode of the variable capacitor 203, characteristics of the variable capacitor 203 are predetermined so that impedance is mismatched between the rectifier circuit 201 and the antenna 202.

In a case of the rectifier circuit 201 shown in FIG. 2A, when a voltage within a predetermined range is applied to the first electrode of the variable capacitor 203, impedance is matched between the rectifier circuit 201 and the antenna 202. In addition, an AC voltage applied to the first electrode of the capacitor 210 is applied to a semiconductor element of a next stage of the variable capacitor 203. Specifically, the AC voltage is applied to the second electrode of the diode 204 and the first electrode of the diode 205.

Meanwhile, in a case of the rectifier circuit 201 shown in FIG. 2B, when a voltage with a large amplitude which exceeds a predetermined range is applied to the first electrode of the variable capacitor 203, the capacitance value of the variable capacitor 203 becomes large. In a case of the variable capacitor 203 connected in series between the terminal A1 corresponding to the input terminal and the output terminal OUT2 of the rectifier circuit 201, if ω, C, and j are angular frequency, a capacitance value, and an imaginary unit respectively, impedance Z is expressed by 1/(jωC). Therefore, as a capacitance value of the variable capacitor 203 is larger, input impedance of the rectifier circuit 201 becomes lower, so that impedance can be mismatched between the rectifier circuit 201 and the antenna 202. Consequently, the amplitude of the AC voltage applied to the first electrode of the capacitor 210 is suppressed by reflection, and the AC voltage is applied to the semiconductor element of the next stage of the variable capacitor 203. Specifically, the AC voltage is applied to the second electrode of the diode 204 and the first electrode of the diode 205.

Note that a designer may appropriately determine ranges of matching and mismatching in accordance with a value of a voltage reduced due to reflection. In an actual design, characteristic impedance of a wiring is also considered, so that it is possible to form a rectifier circuit having characteristics which are more based on the design.

Thus, the rectifier circuit of the present invention can suppress the amplitude of an AC voltage by using reflection. Therefore, a semiconductor element such as the diode 204 or the diode 205 in the rectifier circuit 201 can be prevented from being deteriorated or destroyed due to an excessive current. In addition, a situation that power consumption caused by a limiter short-circuited with a ground (GND) side through parasitic capacitance and parasitic inductance of the limiter can be avoided since a limiter is not necessarily provided for a previous stage of the rectifier circuit, unlike in the conventional method.

Note that the kind and the number of semiconductor elements used in the rectifier circuit 201 are not limited to the structure described in this embodiment mode. In order to obtain a more ideal rectifying characteristic, a resistor, a capacitor, a diode, an inductor, a switch, or the like may be provided in addition to the semiconductor elements shown in FIG. 2A, as appropriate.

Embodiment Mode 3

In this embodiment mode, a structure of a rectifier circuit using a MOS (Metal-Oxide Semiconductor) varactor as a variable capacitor is described.

Figure 3A:
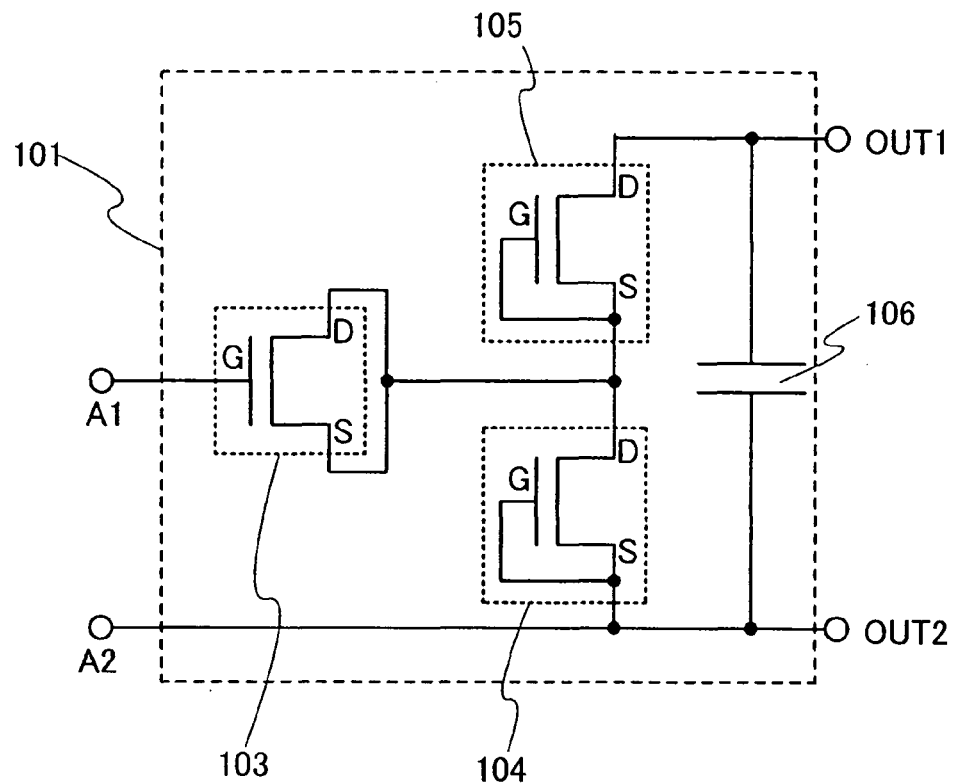
FIGS. 3A and 3B are circuit diagrams each showing a structure of a rectifier circuit of the present invention.

FIG. 3A shows one mode of the rectifier circuit using a MOS varactor of the present invention. FIG. 3A shows an example in which a MOS varactor is used as the variable capacitor 103 included in the rectifier circuit 101 shown in FIG. 1A. In addition, FIG. 3A shows an example in which MOS transistors are used as the diode 104 and the diode 105.

A MOS varactor used as the variable capacitor 103 is a p-channel MOS transistor in which a source region (S) and a drain region (D) are electrically connected. A gate electrode (G) of the MOS transistor corresponds to a first electrode of the variable capacitor 103. In addition, the source region (S) and the drain region (D) collectively correspond to a second electrode of the variable capacitor 103.

A transistor used as the diode 104 is an n-channel MOS transistor in which a source region (S) and a gate electrode (G) are electrically connected. The source region (S) and the gate electrode (G) of the MOS transistor collectively correspond to the first electrode (anode) of the diode 104, and the drain region (D) corresponds to the second electrode (cathode) of the diode 104.

A transistor used as the diode 105 is an n-channel MOS transistor in which a source region (S) and a gate electrode (G) are electrically connected, similarly to the diode 104. The source region (S) and the gate electrode (G) of the MOS transistor collectively correspond to the first electrode (anode) of the diode 105, and the drain region (D) corresponds to the second electrode (cathode) of the diode 105.

Figure 4A:
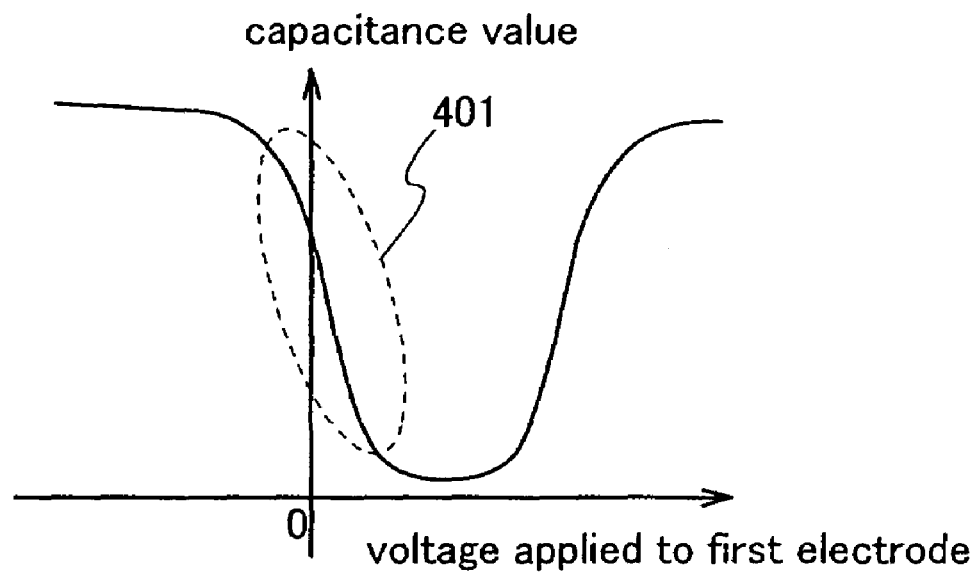
FIGS. 4A and 4B are graphs each showing characteristics of a MOS varactor.

Note that the MOS varactor is formed using a p-channel MOS transistor in FIG. 3A; however, the present invention is not limited to this structure. The MOS varactor may be formed using an n-channel MOS transistor. Note that when the MOS varactor is connected in series between the terminal A1 and the output terminal OUT1 as shown in FIG. 3A, a p-channel MOS transistor is preferably used as the MOS varactor. That is because the MOS varactor formed using a p-channel MOS transistor operates using a region indicated by a dashed line 401 as shown in FIG. 4A. Therefore, as a voltage applied to the first electrode becomes higher, the capacitance value of the variable capacitor 103 decreases and impedance becomes larger. Impedance can be formally dealt with, similar to resistance of a DC circuit, and thus as impedance increases, the amplitude of an AC current supplied to the second electrode of the variable capacitor 103 can be further suppressed. Consequently, in a semiconductor element (the diode 105 in this case) connected between the second electrode of the variable capacitor 103 and the output terminal OUT1, it is possible to more efficiently prevent dielectric breakdown due to current. Similarly, in a semiconductor element (the diode 104 in this case) connected between the second electrode of the variable capacitor 103 and the output terminal OUT2, it is possible to more efficiently prevent dielectric breakdown due to current.

The diode 104 and the diode 105 are formed using n-channel MOS transistors in FIG. 3A; however, the present invention is not limited to this structure. The diode 104 and the diode 105 may be formed using p-channel MOS transistors. Note that, in such a case, the drain region (D) of the MOS transistor correspond to each of the first electrodes (anodes) of the diode 104 and the diode 105, and the source region (S) and the gate electrode (G) correspond to the second electrodes (cathodes) of the diode 104 and the diode 105.

Figure 3B:
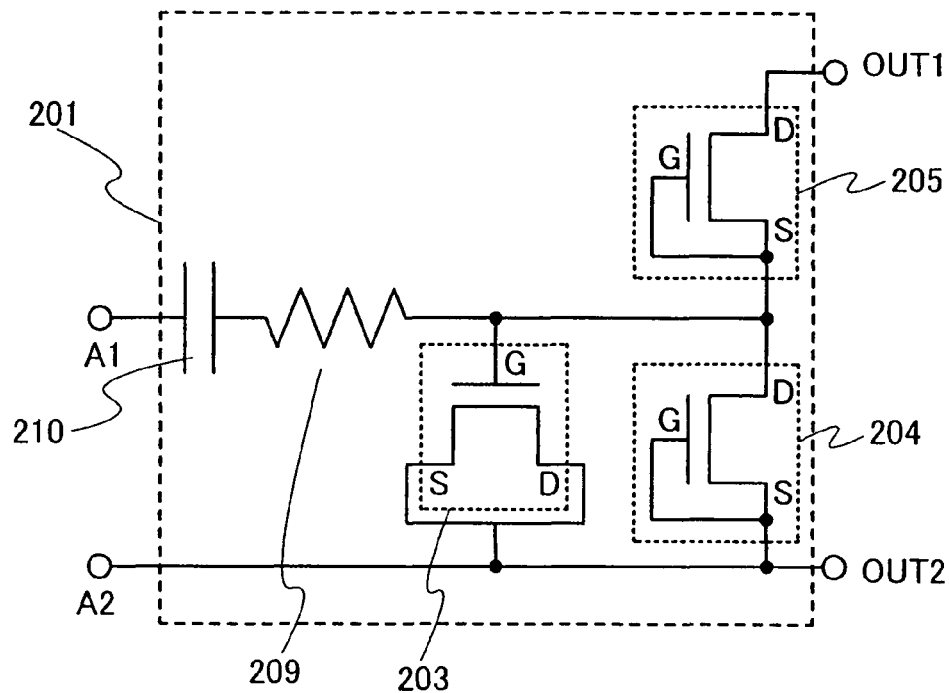

FIG. 3B shows a mode of the rectifier circuit using a MOS varactor of the present invention, which is different from the mode in FIG. 3A. FIG. 3B shows an example in which a MOS varactor is used as the variable capacitor 203 included in the rectifier circuit 201 shown in FIG. 2A. In addition, FIG. 3B shows an example in which n-channel MOS transistors are used as the diode 204 and the diode 205.

A MOS varactor used as the variable capacitor 203 is an n-channel MOS transistor in which a source region (S) and a drain region (D) are electrically connected. A gate electrode (G) of the MOS transistor corresponds to a first electrode of the variable capacitor 203. In addition, the source region (S) and the drain region (D) collectively correspond to a second electrode of the variable capacitor 203.

A transistor used as the diode 204 is an n-channel MOS transistor in which a source region (S) and a gate electrode (G) are electrically connected. The source region (S) and the gate electrode (G) of the MOS transistor collectively correspond to the first electrode (anode) of the diode 204, and the drain region (D) corresponds to the second electrode (cathode) of the diode 204.

A transistor used as the diode 205 is an n-channel MOS transistor in which a source region (S) and a gate electrode (G) are electrically connected, similarly to the diode 204. The source region (S) and the gate electrode (G) of the MOS transistor collectively correspond to the first electrode (anode) of the diode 205, and the drain region (D) corresponds to the second electrode (cathode) of the diode 205.

Figure 4B:
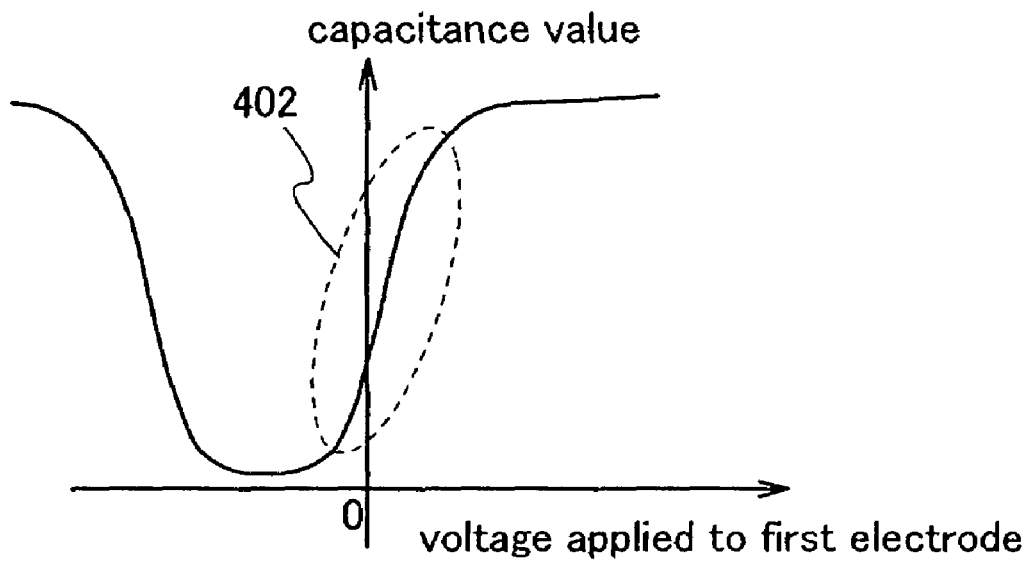

Note that the MOS varactor is formed using an n-channel MOS transistor in FIG. 3B; however, the present invention is not limited to this structure. The MOS varactor may be formed using a p-channel MOS transistor. Note that when the MOS varactor is connected in series between the terminal A1 and the output terminal OUT2 as shown in FIG. 3B, an n-channel MOS transistor is preferably used as the MOS varactor. That is because the MOS varactor formed using an n-channel MOS transistor operates using a region indicated by a dashed line 402 as shown in FIG. 4B. Therefore, as a voltage applied to the first electrode becomes higher, the capacitance value of the variable capacitor 203 becomes larger and impedance is decreased. Impedance can be formally dealt with, similar to resistance of a DC circuit, and thus as impedance is decreased, the amplitude of an AC current supplied to the second electrode of the variable capacitor 203 can be further suppressed. Consequently, in a semiconductor element (the diode 205 in this case) connected between the first electrode of the variable capacitor 203 and the output terminal OUT1, it is possible to more efficiently prevent dielectric breakdown due to current. Similarly, in a semiconductor element (the diode 204 in this case) connected between the first electrode of the variable capacitor 203 and the output terminal OUT2, it is possible to more efficiently prevent dielectric breakdown due to current.

The diode 204 and the diode 205 are formed using n-channel MOS transistors in FIG. 3B; however, the present invention is not limited to this structure. The diode 204 and the diode 205 may be formed using p-channel MOS transistors. Note that, in such a case, the drain region (D) of the MOS transistor correspond to each of the first electrodes (anodes) of the diode 204 and the diode 205, and the source region (S) and the gate electrode (G) correspond to the second electrodes (cathodes) of the diode 204 and the diode 205.

Note that the MOS varactor or the transistor used as a diode may be a transistor formed using a semiconductor substrate or a transistor formed using an SOI substrate. Alternatively, a transistor formed using a thin semiconductor film formed over a substrate having an insulating surface, such as a glass substrate, a quartz substrate, or a plastic substrate.

All components including a variable capacitor in the rectifier circuit of the present invention can be formed through a normal MOS process. In a conventional limiter, a zener diode is used as a semiconductor element functioning as a switch in some cases. It has been difficult to form a zener diode through a normal MOS (metal-oxide semiconductor) process. However, all components including the variable capacitor in the rectifier circuit of the present invention can be formed through the normal MOS process. Therefore, the rectifier circuit and also a semiconductor device using the rectifier circuit can be reduced in size.

Embodiment 1

In this embodiment, a structure of the rectifier circuit of the present invention, in which the level of an output voltage can be threefold, is described with reference to FIG. 5.

Figure 5:
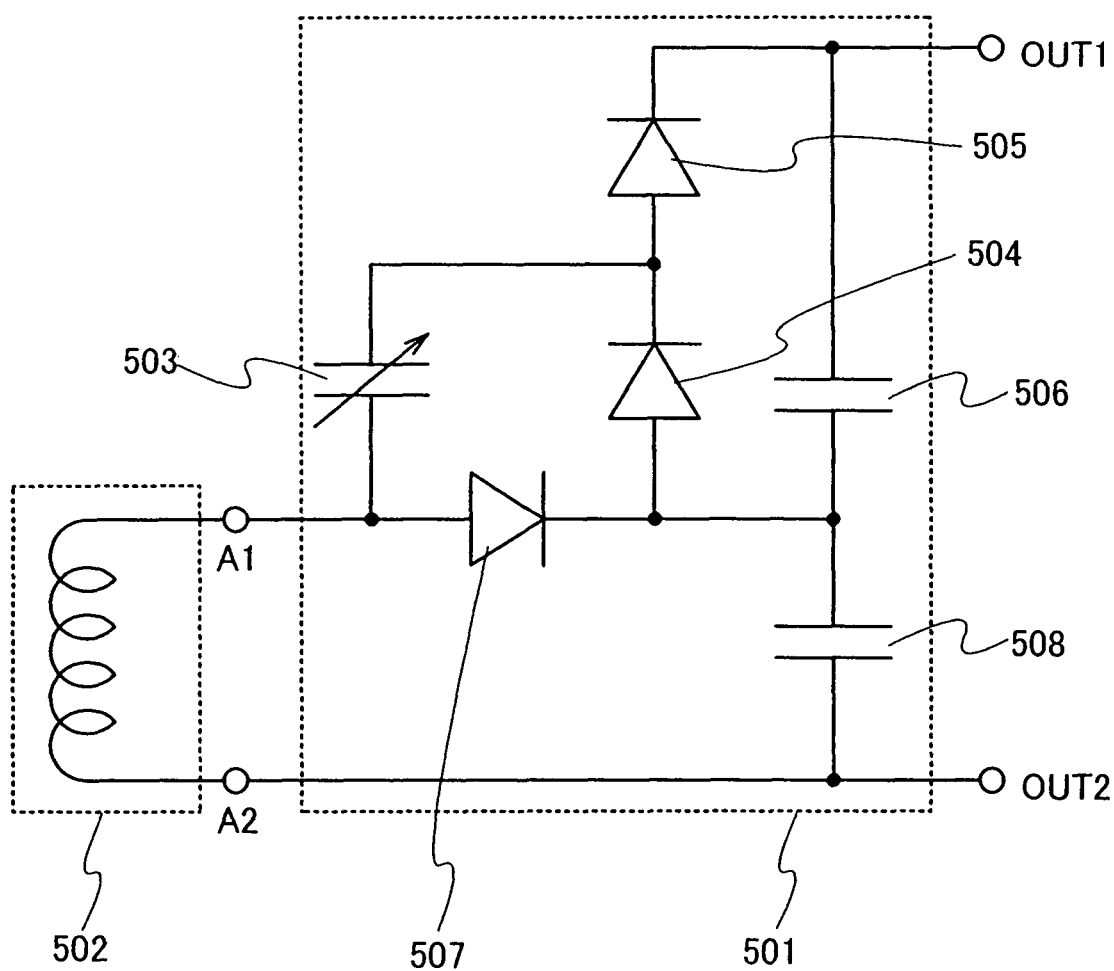
FIG. 5 is a circuit diagram showing a structure of a rectifier circuit of the present invention.

In FIG. 5, a rectifier circuit 501 is connected to a terminal A1 and a terminal A2 of an antenna 502, and the terminal A1 and the terminal A2 of the antenna 502 function as input terminals of the rectifier circuit 501. Note that FIG. 5 shows a case where the antenna 502 has a coil shape; however, the shape of the antenna used in this embodiment is not limited to this. When communication is performed using an electric field instead of a magnetic field, the antenna 502 does not necessarily have a coil shape.

The rectifier circuit 501 includes a variable capacitor 503, a diode 504, a diode 505, and a diode 507 which are for rectifying an AC voltage applied between the terminal A1 and the terminal A2, and a smoothing capacitor 506 and a smoothing capacitor 508 for smoothing the rectified voltage. The variable capacitor 503 has at least two electrodes. The capacitance value of the variable capacitor 503 changes in accordance with the value of a voltage applied between the electrodes, that is, a first electrode and a second electrode. In this embodiment, a variable-capacitance diode is used as the variable capacitor 503.

The smoothing capacitor 506 and the smoothing capacitor 508 are connected in series between an output terminal OUT1 and an output terminal OUT2 of the rectifier circuit 501. In the rectifier circuit 501 shown in FIG. 5, the smoothing capacitor 506 and the smoothing capacitor 508 are used for smoothing the rectified voltage; however, these capacitors are not necessarily provided. Note that by using the smoothing capacitor 506 and the smoothing capacitor 508, a component other than a DC component in the rectified voltage, such as ripple, can be reduced.

In the rectifier circuit 501 shown in FIG. 5, the terminal A1 is connected to the first electrode of the variable capacitor 503 and a first electrode (anode) of the diode 507. In addition, the second electrode of the variable capacitor 503 is connected to a second electrode (cathode) of the diode 504 and a first electrode (anode) of the diode 505. A first electrode (anode) of the diode 504 and a second electrode (cathode) of the diode 507 are connected to a second electrode of the smoothing capacitor 506 and a first electrode of the smoothing capacitor 508. A second electrode (cathode) of the diode 505 and a first electrode of the smoothing capacitor 506 are connected to the output terminal OUT1. A second electrode of the smoothing capacitor 508 is connected to the terminal A2 and the output terminal OUT2.

In FIG. 5, when the terminal A2 is connected to the ground (GND), the second electrode of the smoothing capacitor 508 is connected to GND.

When the antenna 502 is subjected to a radio wave having a wavelength within a specific range, an AC electromotive force is generated in the antenna 502, and then an AC voltage is applied between the terminal A1 and the terminal A2. If the amplitude of the AC voltage applied between the terminal A1 and the terminal A2 is Vh, a voltage which is almost three times as high as Vh is fed to the output terminal OUT1.

Input impedance of the rectifier circuit 501 can be changed in accordance with a capacitance value of the variable capacitor 503. The capacitance value of the variable capacitor 503 can be changed in accordance with the value of a voltage applied to the first electrode. In a case of the rectifier circuit 501 shown in FIG. 5, when a voltage within a predetermined range is applied to the first electrode of the variable capacitor 503, impedance is matched between the rectifier circuit 501 and the antenna 502. An AC voltage applied to the first electrode is applied to a semiconductor element of a next stage of the variable capacitor 503. Specifically, the AC voltage is applied to the second electrode of the diode 504 and the first electrode of the diode 505.

Meanwhile, in a case of the rectifier circuit 501 shown in FIG. 5, when a voltage with a large amplitude which exceeds a predetermined range is applied to the first electrode of the variable capacitor 503, a capacitance value of the variable capacitor 503 becomes small. As a capacitance value of the variable capacitor 503 is decreased, input impedance of the rectifier circuit 501 is increased, so that impedance can be mismatched between the rectifier circuit 501 and the antenna 502. Consequently, the amplitude of the AC voltage applied to the first electrode is suppressed by reflection, and the AC voltage is applied to the semiconductor element of the next stage of the variable capacitor 503. Specifically, the AC voltage is applied to the second electrode of the diode 504 and the first electrode of the diode 505.

Thus, the rectifier circuit of this embodiment can suppress the amplitude of an AC voltage by using reflection. Therefore, a semiconductor element in the rectifier circuit 501, such as the diode 504, the diode 505, or the smoothing capacitor 506, can be prevented from being deteriorated or destroyed due to an excessive current. In addition, since a limiter is not necessarily provided for a previous stage of the rectifier circuit unlike in the conventional way, it can be avoided that a limiter is short-circuited with a ground (GND) side through parasitic capacitance and parasitic inductance of the limiter, and thus power consumption is avoided.

Note that a kind and the number of semiconductor elements used in the rectifier circuit 501 are not limited to the structure described in this embodiment. In order to obtain a more ideal rectifying characteristic, a resistor, a capacitor, a diode, an inductor, a switch, or the like may be provided in addition to the semiconductor elements shown in FIG. 5, as appropriate.

Embodiment 2

In this embodiment, a structure of the rectifier circuit of the present invention, in which the level of an output voltage can be threefold, is described with reference to FIG. 6.

Figure 6:
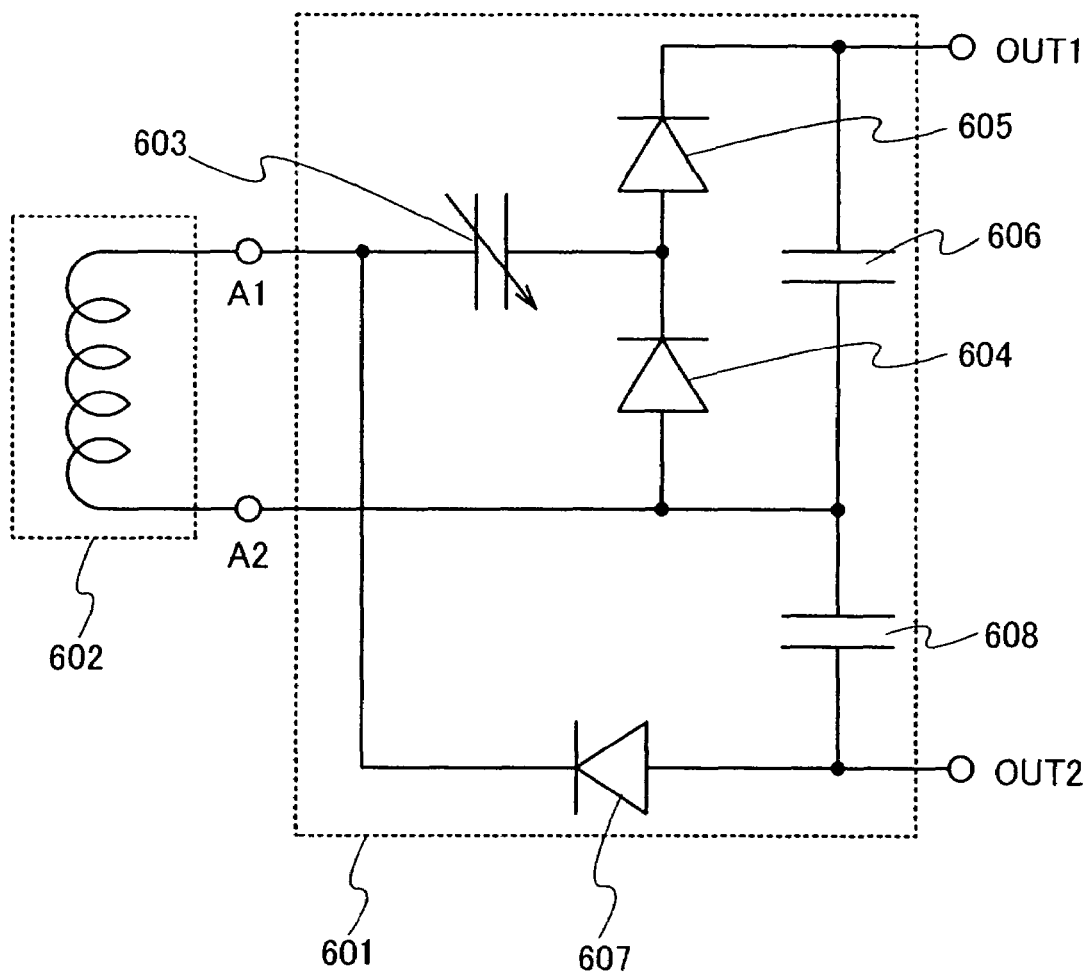
FIG. 6 is a circuit diagram showing a structure of a rectifier circuit of the present invention.

In FIG. 6, a rectifier circuit 601 is connected to a terminal A1 and a terminal A2 of an antenna 602, and the terminal A1 and the terminal A2 of the antenna 602 function as input terminals of the rectifier circuit 601. Note that FIG. 6 shows a case where the antenna 602 has a coil shape; however, the shape of the antenna used in this embodiment is not limited to this. When communication is performed using an electric field instead of a magnetic field, the antenna 602 does not necessarily have a coil shape.

The rectifier circuit 601 includes a variable capacitor 603, a diode 604, a diode 605, and a diode 607 which are for rectifying an AC voltage applied between the terminal A1 and the terminal A2, and a smoothing capacitor 606 and a smoothing capacitor 608 for smoothing the rectified voltage. The variable capacitor 603 has at least two electrodes. The capacitance value of the variable capacitor 603 changes in accordance with the value of a voltage applied between the electrodes, that is, a first electrode and a second electrode. In this embodiment, a variable-capacitance diode is used as the variable capacitor 603.

The smoothing capacitor 606 and the smoothing capacitor 608 are connected in series between an output terminal OUT1 and an output terminal OUT2 of the rectifier circuit 601. In the rectifier circuit 601 shown in FIG. 6, the smoothing capacitor 606 and the smoothing capacitor 608 are used for smoothing the rectified voltage; however, these capacitors are not necessarily provided. Note that by using the smoothing capacitor 606 and the smoothing capacitor 608, a component other than a DC component in the rectified voltage, such as ripple, can be reduced.

In the rectifier circuit 601 shown in FIG. 6, the terminal A1 is connected to the first electrode of the variable capacitor 603 and a second electrode (cathode) of the diode 607. In addition, the second electrode of the variable capacitor 603 is connected to a second electrode (cathode) of the diode 604 and a first electrode (anode) of the diode 605. A first electrode (anode) of the diode 604 and the terminal A2 are connected to a second electrode of the smoothing capacitor 606 and a first electrode of the smoothing capacitor 608. A first electrode (anode) of the diode 607 and a second electrode of the smoothing capacitor 608 are connected to the output terminal OUT2. A second electrode (cathode) of the diode 605 and a first electrode of the smoothing capacitor 606 are connected to the output terminal OUT1.

In FIG. 6, when the terminal A2 is connected to the ground (GND), the first electrode (anode) of the diode 604, the second electrode of the smoothing capacitor 606, and the first electrode of the smoothing capacitor 608 are connected to GND.

When the antenna 602 is subjected to a radio wave having a wavelength within a specific range, an AC electromotive force is generated in the antenna 602, and then an AC voltage is applied between the terminal A1 and the terminal A2. If the amplitude of the AC voltage applied between the terminal A1 and the terminal A2 is Vh, a voltage which is almost three times as high as Vh is fed to the output terminal OUT1.

Input impedance of the rectifier circuit 601 can be changed in accordance with the capacitance value of the variable capacitor 603. The capacitance value of the variable capacitor 603 can be changed in accordance with a value of a voltage applied to the first electrode. In a case of the rectifier circuit 601 shown in FIG. 6, when a voltage within a predetermined range is applied to the first electrode of the variable capacitor 603, impedance is matched between the rectifier circuit 601 and the antenna 602. An AC voltage applied to the first electrode is applied to a semiconductor element of a next stage of the variable capacitor 603. Specifically, the AC voltage is applied to the second electrode of the diode 604 and the first electrode of the diode 605.

Meanwhile, in a case of the rectifier circuit 601 shown in FIG. 6, when a voltage with a large amplitude which exceeds a predetermined range is applied to the first electrode of the variable capacitor 603, a capacitance value of the variable capacitor 603 becomes small. As a capacitance value of the variable capacitor 603 becomes smaller, input impedance of the rectifier circuit 601 becomes higher, so that impedance can be mismatched between the rectifier circuit 601 and the antenna 602. Consequently, the amplitude of the AC voltage applied to the first electrode is suppressed by reflection, and the AC voltage is applied to the semiconductor element of the next stage of the variable capacitor 603. Specifically, the AC voltage is applied to the second electrode of the diode 604 and the first electrode of the diode 605.

Thus, the rectifier circuit of this embodiment can suppress the amplitude of an AC voltage by using reflection. Therefore, a semiconductor element, such as the diode 604, the diode 605, or the smoothing capacitor 606, in the rectifier circuit 601 can be prevented from being deteriorated or destroyed due to excessive current. In addition, the situation that power consumption caused by a limiter short-circuited with a ground (GND) side through parasitic capacitance and parasitic inductance of the limiter can be avoided since a limiter is not necessarily provided for a previous stage of the rectifier circuit, unlike in the conventional method.

Note that the kind and the number of semiconductor elements used in the rectifier circuit 601 are not limited to the structure described in this embodiment. In order to obtain a more ideal rectifying characteristic, a resistor, a capacitor, a diode, an inductor, a switch, or the like may be provided in addition to the semiconductor elements shown in FIG. 6, as appropriate.

Embodiment 3

In this embodiment, a structure of the rectifier circuit of the present invention, in which the level of an output voltage can be fourfold, is described with reference to FIG. 7.

Figure 7:
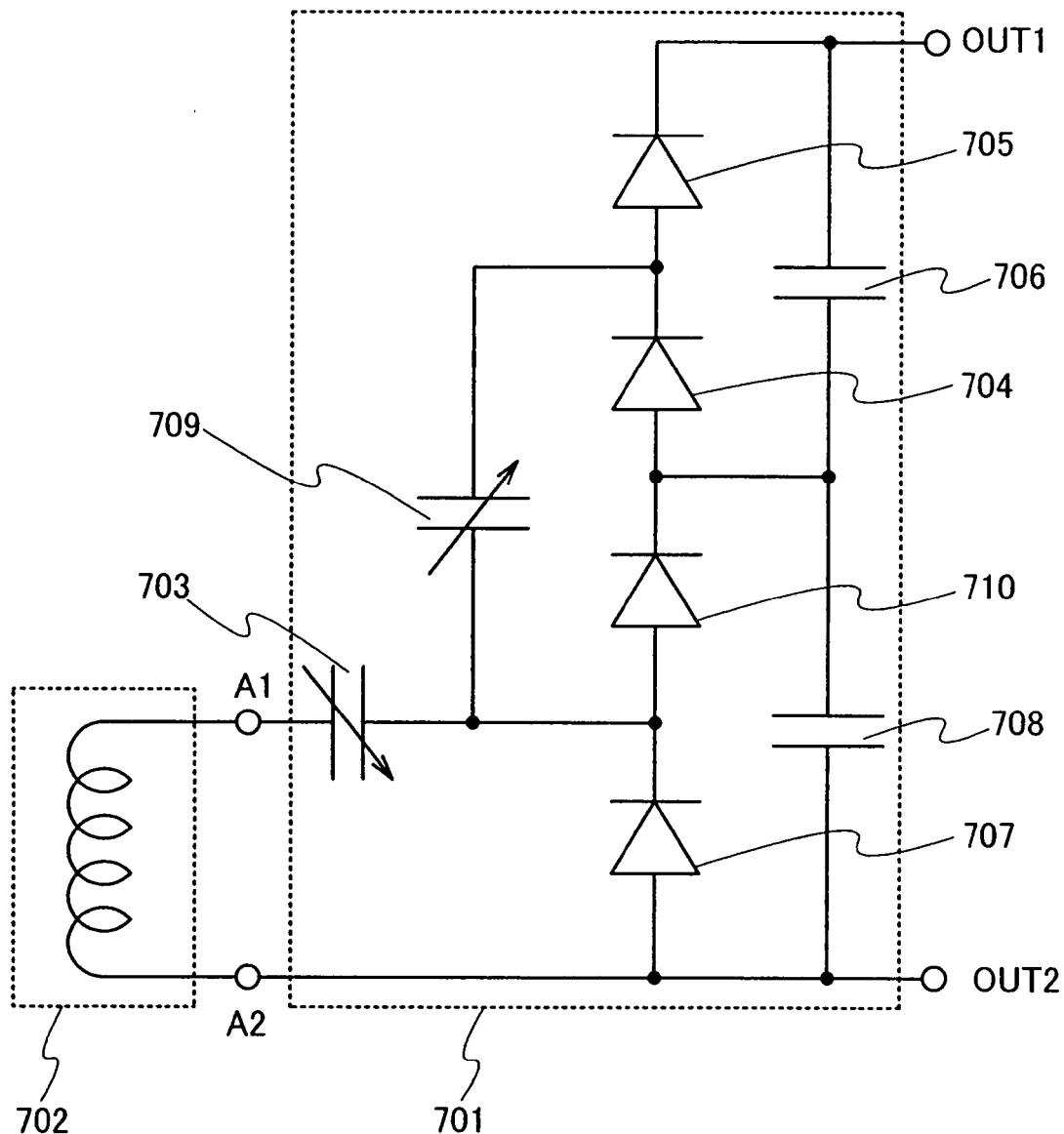
FIG. 7 is a circuit diagram showing a structure of a rectifier circuit of the present invention.

In FIG. 7, a rectifier circuit 701 is connected to a terminal A1 and a terminal A2 of an antenna 702, and the terminal A1 and the terminal A2 of the antenna 702 function as input terminals of the rectifier circuit 701. Note that FIG. 7 shows a case where the antenna 702 has a coil shape; however, the shape of the antenna used in this embodiment is not limited to this. When communication is performed using an electric field instead of a magnetic field, the antenna 702 does not necessarily have a coil shape.

The rectifier circuit 701 includes a variable capacitor 703 and a variable capacitor 709; a diode 704, a diode 705, a diode 707, and a diode 710 which are for rectifying an AC voltage applied between the terminal A1 and the terminal A2; and a smoothing capacitor 706 and a smoothing capacitor 708 for smoothing the rectified voltage. The variable capacitor 703 and the variable capacitor 709 each have at least two electrodes. The capacitance value of each of the variable capacitor 703 and the variable capacitor 709 changes in accordance with the value of a voltage applied between the electrodes, that is, a first electrode and a second electrode. In this embodiment, variable-capacitance diodes are used as the variable capacitor 703 and the variable capacitor 709.

The smoothing capacitor 706 and the smoothing capacitor 708 are connected in series between an output terminal OUT1 and an output terminal OUT2 of the rectifier circuit 701. In the rectifier circuit 701 shown in FIG. 7, the smoothing capacitor 706 and the smoothing capacitor 708 are used for smoothing the rectified voltage; however, these capacitors are not necessarily provided. Note that, by using the smoothing capacitor 706 and the smoothing capacitor 708, a component other than a DC component in the rectified voltage, such as ripple, can be reduced.

In the rectifier circuit 701 shown in FIG. 7, the terminal A1 is connected to the first electrode of the variable capacitor 703. In addition, the second electrode of the variable capacitor 703 is connected to the first electrode of the variable capacitor 709, a first electrode (anode) of the diode 710, and a second electrode (cathode) of the diode 707. The second electrode of the variable capacitor 709 is connected to a second electrode (cathode) of the diode 704 and a first electrode (anode) of the diode 705. A first electrode (anode) of the diode 707 and a second electrode of the smoothing capacitor 708 are connected to the terminal A2 and the output terminal OUT2. A first electrode (anode) of the diode 704 and a second electrode (cathode) of the diode 710 are connected to a second electrode of the smoothing capacitor 706 and a first electrode of the smoothing capacitor 708. A second electrode (cathode) of the diode 705 and a first electrode of the smoothing capacitor 706 are connected to the output terminal OUT1.

In FIG. 7, when the terminal A2 is connected to the ground (GND), the first electrode (anode) of the diode 707 and the second electrode of the smoothing capacitor 708 are connected to GND.

When the antenna 702 is subjected to a radio wave having a wavelength within a specific range, an AC electromotive force is generated in the antenna 702, and then an AC voltage is applied between the terminal A1 and the terminal A2. If the amplitude of the AC voltage applied between the terminal A1 and the terminal A2 is Vh, a voltage which is almost four times as high as Vh is fed to the output terminal OUT1.

Input impedance of the rectifier circuit 701 can be changed in accordance with the capacitance values of the variable capacitor 703 and the variable capacitor 709. Capacitance values of the variable capacitor 703 and the variable capacitor 709 can be changed in accordance with the value of a voltage applied to the first electrode. In a case of the rectifier circuit 701 shown in FIG. 7, when a voltage within a predetermined range is applied to the first electrode of the variable capacitor 703, impedance is matched between the rectifier circuit 701 and the antenna 702. In addition, an AC voltage applied to the first electrode is applied to a semiconductor element of a next stage of the variable capacitor 703. Specifically, the AC voltage is applied to the first electrode of the variable capacitor 709, the first electrode of the diode 710, and the second electrode of the diode 707.

Meanwhile, when a voltage with a large amplitude which exceeds a predetermined range is applied to the first electrode of the variable capacitor 703, the capacitance value of the variable capacitor 703 becomes small. As the capacitance value of the variable capacitor 703 becomes smaller, input impedance of the rectifier circuit 701 becomes higher, so that impedance can be mismatched between the rectifier circuit 701 and the antenna 702. Consequently, the amplitude of the AC voltage applied to the first electrode is suppressed by reflection, and the AC voltage is applied to the semiconductor element of the next stage of the variable capacitor 703. Specifically, the AC voltage is applied to the first electrode of the variable capacitor 709, the first electrode of the diode 710, and the second electrode of the diode 707.

It is also assumed that the amplitude of an AC voltage applied to the first electrode of the variable capacitor 709, the first electrode of the diode 710, and the second electrode of the diode 707 is still high enough to exceed a predetermined range. In this embodiment, the capacitance value of the variable capacitor 709 is deceased so that impedance can be mismatched even in such a case. Consequently, the amplitude of the AC voltage applied to the first electrode of the variable capacitor 709 is suppressed by reflection, and the AC voltage is applied to the semiconductor element of the next stage of the variable capacitor 709. Specifically, the AC voltage is applied to the first electrode of the diode 705 and the second electrode of the diode 704.

Thus, the rectifier circuit 701 of this embodiment can suppress the amplitude of an AC voltage by using reflection. Therefore, a semiconductor element in the rectifier circuit 701, such as the diode 704, the diode 705, the diode 707, the diode 710, the smoothing capacitor 706, or the smoothing capacitor 708, can be prevented from being deteriorated or destroyed due to an excessive current. In addition, the situation that power consumption caused by a limiter short-circuited with a ground (GND) side through parasitic capacitance and parasitic inductance of the limiter can be avoided since a limiter is not necessarily provided for a previous stage of the rectifier circuit, unlike in the conventional method.

In this embodiment, a structure of the rectifier circuit using two variable capacitors is described; however, one of the variable capacitor 703 and the variable capacitor 709 may be substituted with a capacitor having a fixed capacitance value. Note that by using the variable capacitor 703 and the variable capacitor 709, reliability of the rectifier circuit 701 can be further improved.

Note that the kind and the number of semiconductor elements used in the rectifier circuit 701 are not limited to the structure described in this embodiment. In order to obtain a more ideal rectifying characteristic, a resistor, a capacitor, a diode, an inductor, a switch, or the like may be provided in addition to the semiconductor elements shown in FIG. 7, as appropriate.

Embodiment 4

In this embodiment, a structure of the rectifier circuit of the present invention, in which the level of an output voltage can be fourfold, is described with reference to FIG. 8.

Figure 8:
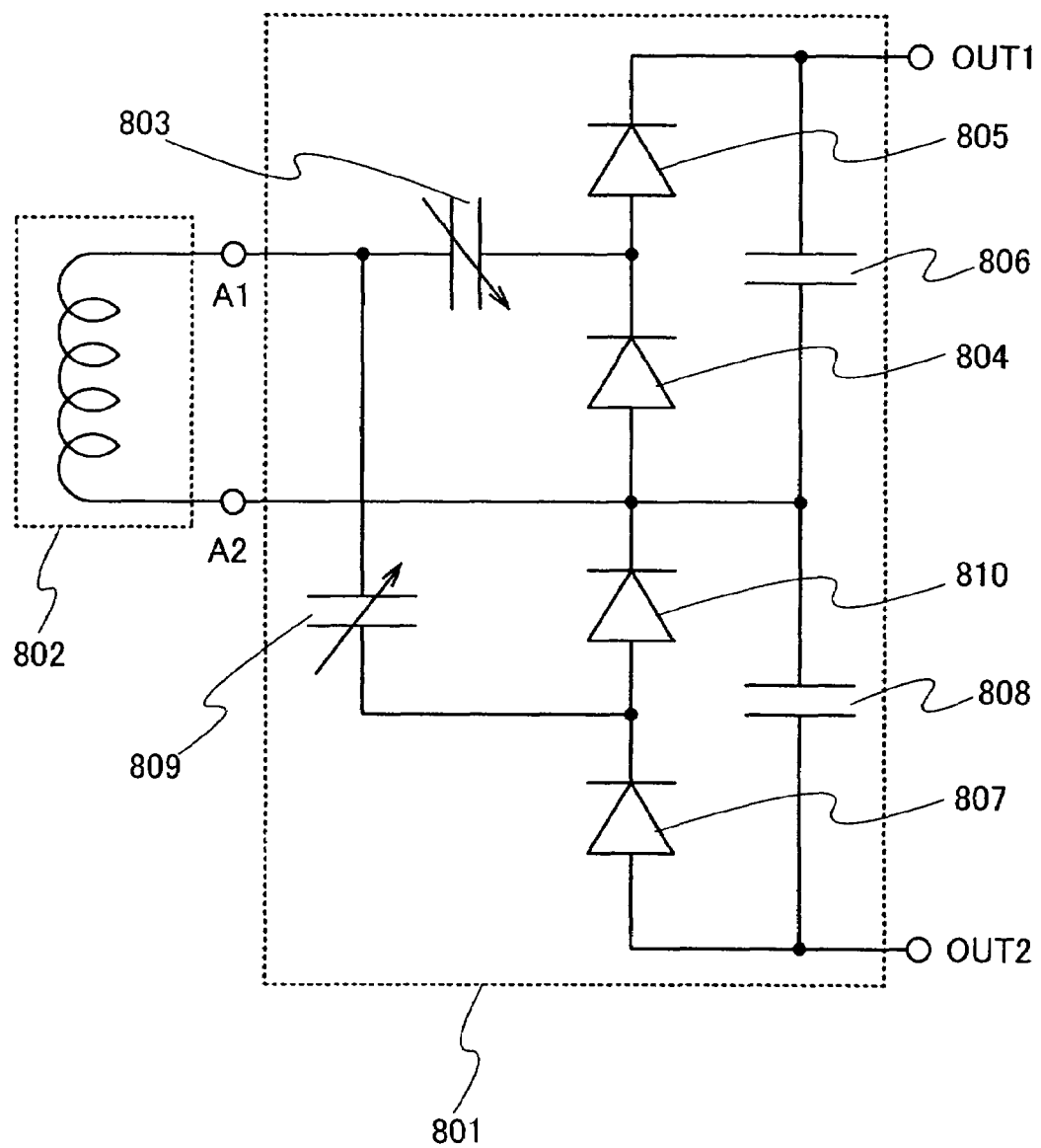
FIG. 8 is a circuit diagram showing a structure of a rectifier circuit of the present invention.

In FIG. 8, a rectifier circuit 801 is connected to a terminal A1 and a terminal A2 of an antenna 802, and the terminal A1 and the terminal A2 of the antenna 802 function as input terminals of the rectifier circuit 801. Note that FIG. 8 shows a case where the antenna 802 has a coil shape; however, the shape of the antenna used in this embodiment is not limited to this. When communication is performed using an electric field instead of a magnetic field, the antenna 802 does not necessarily have a coil shape.

The rectifier circuit 801 includes a variable capacitor 803 and a variable capacitor 809; a diode 804, a diode 805, a diode 807, and a diode 810 which are for rectifying an AC voltage applied between the terminal A1 and the terminal A2; and a smoothing capacitor 806 and a smoothing capacitor 808 for smoothing the rectified voltage. The variable capacitor 803 and the variable capacitor 809 each have at least two electrodes. The capacitance value of each of the variable capacitor 803 and the variable capacitor 809 changes in accordance with the value of a voltage applied between the electrodes, that is, a first electrode and a second electrode. In this embodiment, variable-capacitance diodes are used as the variable capacitor 803 and the variable capacitor 809.

The smoothing capacitor 806 and the smoothing capacitor 808 are connected in series between an output terminal OUT1 and an output terminal OUT2 of the rectifier circuit 801. In the rectifier circuit 801 shown in FIG. 8, the smoothing capacitor 806 and the smoothing capacitor 808 are used for smoothing the rectified voltage; however, these capacitors are not necessarily provided. Note that, by using the smoothing capacitor 806 and the smoothing capacitor 808, a component other than a DC component in the rectified voltage, such as ripple, can be reduced.

In the rectifier circuit 801 shown in FIG. 8, the terminal A1 is connected to the first electrode of the variable capacitor 803 and the first electrode of the variable capacitor 809. In addition, the second electrode of the variable capacitor 809 is connected to a first electrode (anode) of the diode 810 and a second electrode (cathode) of the diode 807. The second electrode of the variable capacitor 803 is connected to a second electrode (cathode) of the diode 804 and a first electrode (anode) of the diode 805. A first electrode (anode) of the diode 807 and a second electrode of the smoothing capacitor 808 are connected to the output terminal OUT2. A first electrode (anode) of the diode 804 and a second electrode (cathode) of the diode 810 are connected to the terminal A2, a second electrode of the smoothing capacitor 806, and a first electrode of the smoothing capacitor 808. A second electrode (cathode) of the diode 805 and a first electrode of the smoothing capacitor 806 are connected to the output terminal OUT1.

In FIG. 8, when the terminal A2 is connected to the ground (GND), the first electrode of the diode 804, the second electrode of the diode 810, the second electrode of the smoothing capacitor 806, and the first electrode of the smoothing capacitor 808 are connected to GND.

When the antenna 802 is subjected to a radio wave having a wavelength within a specific range, an AC electromotive force is generated in the antenna 802, and then an AC voltage is applied between the terminal A1 and the terminal A2. If the amplitude of the AC voltage applied between the terminal A1 and the terminal A2 is Vh, a voltage which is almost four times as high as Vh is fed to the output terminal OUT1.

Input impedance of the rectifier circuit 801 can be changed in accordance with the capacitance values of the variable capacitor 803 and the variable capacitor 809. Capacitance values of the variable capacitor 803 and the variable capacitor 809 can be changed in accordance with the value of a voltage applied to the first electrode. In a case of the rectifier circuit 801 shown in FIG. 8, when a voltage within a predetermined range is applied to the first electrodes of the variable capacitor 803 and the variable capacitor 809, impedance is matched between the rectifier circuit 801 and the antenna 802. In addition, an AC voltage applied to the first electrode is applied to a semiconductor element of a next stage of the variable capacitor 803 and the variable capacitor 809. Specifically, the AC voltage is applied to the first electrode of the diode 810, the second electrode of the diode 807, the second electrode of the diode 804, and the first electrode of the diode 805.

Meanwhile, when a voltage with a large amplitude which exceeds a predetermined range is applied to the first electrodes of the variable capacitor 803 and the variable capacitor 809, the capacitance values of the variable capacitor 803 and the variable capacitor 809 become small. As the capacitance values of the variable capacitor 803 and the variable capacitor 809 become smaller, input impedance of the rectifier circuit 801 becomes higher, so that impedance can be mismatched between the rectifier circuit 801 and the antenna 802. Consequently, the amplitude of the AC voltage applied to the first electrode is suppressed by reflection, and the AC voltage is applied to the semiconductor element of the next stage of the variable capacitor 803 and the variable capacitor 809. Specifically, the AC voltage is applied to the first electrode of the diode 810, the second electrode of the diode 807, the second electrode of the diode 804, and the first electrode of the diode 805.

Thus, the rectifier circuit 801 of this embodiment can suppress the amplitude of an AC voltage by using reflection. Therefore, a semiconductor element in the rectifier circuit 801, such as the diode 804, the diode 805, the diode 807, the diode 810, the smoothing capacitor 806, or the smoothing capacitor 808, can be prevented from being deteriorated or destroyed due to an excessive current. In addition, the situation that power consumption caused by a limiter short-circuited with a ground (GND) side through parasitic capacitance and parasitic inductance of the limiter can be avoided since a limiter is not necessarily provided for a previous stage of the rectifier circuit, unlike in the conventional method.

In this embodiment, a structure of the rectifier circuit using two variable capacitors is described; however, one of the variable capacitor 803 and the variable capacitor 809 may be substituted with a capacitor having a fixed capacitance value. Note that by using the variable capacitor 803 and the variable capacitor 809, reliability of the rectifier circuit 801 can be further improved.

Note that the kind and the number of semiconductor elements used in the rectifier circuit 801 are not limited to the structure described in this embodiment. In order to obtain a more ideal rectifying characteristic, a resistor, a capacitor, a diode, an inductor, a switch, or the like may be provided in addition to the semiconductor elements shown in FIG. 8, as appropriate.

Embodiment 5

Figure 9:
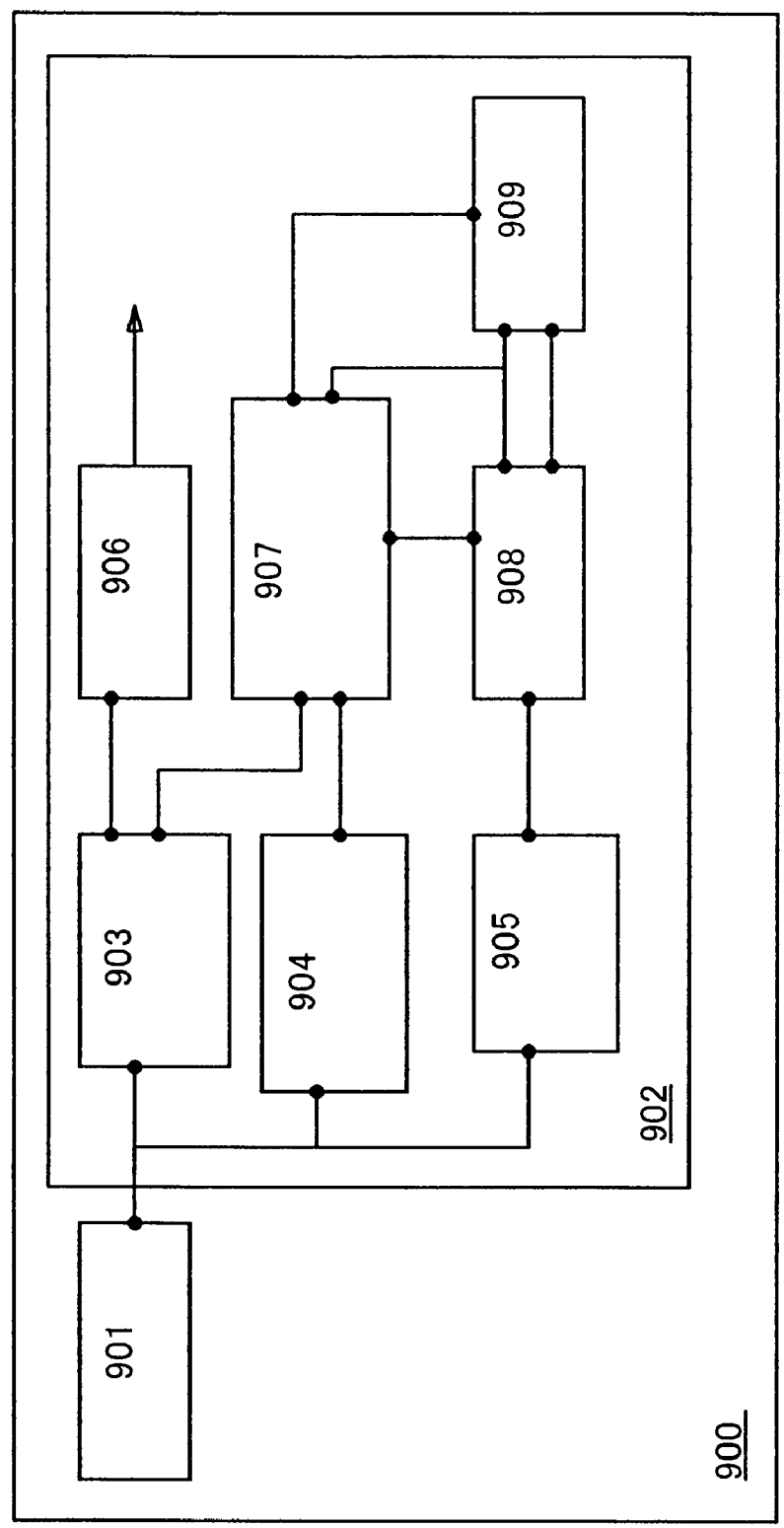
FIG. 9 is a block diagram showing a structure of a semiconductor device of the present invention.

A structure of the semiconductor device of the present invention is described with reference to FIG. 9. FIG. 9 is a block diagram showing one mode of the semiconductor device of the present invention. In FIG. 9, a semiconductor device 900 includes an antenna 901 and an integrated circuit 902. The integrated circuit 902 includes a rectifier circuit 903, a demodulation circuit 904, a modulation circuit 905, a regulator 906, a signal generating circuit 907, an encoder 908, and a memory 909.

When a radio wave is transmitted from a reader, the radio wave is converted into an AC voltage in the antenna 901. In the rectifier circuit 903, the AC voltage from the antenna 901 is rectified to generate a voltage for a power source. In the rectifier circuit 903 of the present invention, a voltage for a power source can be generated while a semiconductor element in the rectifier circuit 903 is prevented from being deteriorated or destroyed even when the AC voltage generated in the antenna 901 has an amplitude large enough to exceed a predetermined range.

The voltage for a power source, which is generated in the rectifier circuit 903, is fed to the signal generating circuit 907 and the regulator 906. After stabilizing the voltage for a power source from the rectifier circuit 903 or after adjusting the level thereof, the regulator 906 supplies the voltage to various circuits in the integrated circuit 902 such as the demodulation circuit 904, the modulation circuit 905, the signal generating circuit 907, the encoder 908, and the memory 909.

The demodulation circuit 904 demodulates the AC voltage from the antenna 901 to generate a signal and outputs the signal to the signal generating circuit 907 of a next stage. The signal generating circuit 907 performs arithmetic processing in accordance with the signal input from the demodulation circuit 904 and generates another signal. When the arithmetic processing is performed, the memory 909 can be used as a primary cache memory or a secondary cache memory. The signal generated in the signal generating circuit 907 is encoded in the encoder 908 and then output to the modulation circuit 905. The modulation circuit 905 modulates a radio wave generated in the antenna 901 in accordance with the signal. The modulated radio wave is generated in the antenna 901 and accordingly, the reader can receive the signal from the signal generating circuit 907 with the radio wave.

Thus, communication between the semiconductor device 900 and the reader can be performed by modulating a radio wave used as a carrier (carrier wave). As the carrier, a radio wave with a frequency of 125 KHz, 13.56 MHz, 950 MHz, or the like can be used. A modulation method includes, but is not particularly limited to, amplitude modulation, frequency modulation, phase modulation, and the like.

A signal transmission method can be categorized into an electromagnetic coupling method, an electromagnetic induction method, a microwave method, and the like in accordance with the wavelength of a carrier. In a case of an electromagnetic coupling method or an electromagnetic induction method, there is a possibility that a semiconductor device is subjected to an intense radio wave and thus an excessively high AC voltage occurs in an antenna. Using the rectifier circuit of the present invention makes it possible to prevent deterioration or destruction of a semiconductor element in an integrated circuit, which is particularly effective in the case of an electromagnetic coupling method or an electromagnetic induction method.

The memory 909 may be either a nonvolatile memory or a volatile memory. As the memory 909, an SRAM, a DRAM, a flash memory, an EEPROM, an FeRAM, or the like can be used.

In this embodiment, a structure of the semiconductor device 900 including the antenna 901 is described; however, the semiconductor device of the present invention does not necessarily include an antenna. In addition, the semiconductor device shown in FIG. 9 may be provided with an oscillation circuit or a secondary battery.

In FIG. 9, a structure of the semiconductor device including only one antenna is described; however, the present invention is not limited to this structure. A semiconductor device may include two antennas, that is, an antenna for receiving power and an antenna for receiving a signal. If a semiconductor device includes one antenna, in a case where both supply of power and transmission of a signal are performed with a radio wave of 950 MHz for example, there is a possibility that a large amount of power is transmitted over a distance and reception of other wireless devices is prevented. Therefore, it is desirable that power be supplied in a short distance with a radio wave having decreased frequency; however, a communication distance is inevitably short in that case. On the other hand, if a semiconductor device includes two antennas, frequency of a radio wave for supplying power and frequency of a radio wave for transmitting a signal can be separately used. For example, in the case of transmitting power, a radio wave with a frequency of 13.56 MHz and a magnetic field are used, and in the case of transmitting a signal, a radio wave with a frequency of 950 MHz and an electric field are used. Thus, by separately using antennas depending on functions, power can be supplied for communication only in a short distance and a signal can be transmitted even in a long distance.

This embodiment can be implemented in combination with any of Embodiment Modes 1 to 3 and Embodiments 1 to 4 as appropriate.

Embodiment 6

Next, an exterior view of the semiconductor device of the present invention is described.

Figure 10A:
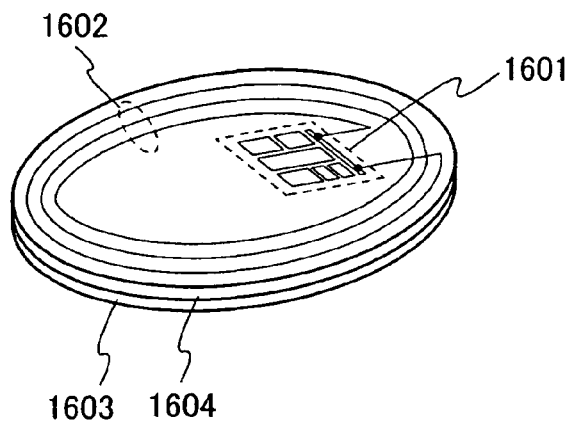
FIGS. 10A and 10B are exterior views each showing a semiconductor device of the present invention.

FIG. 10A is a perspective view showing one mode of the semiconductor device of the present invention, which is formed into a chip. Reference numerals 1601 and 1602 refer to an integrated circuit and an antenna, respectively. The antenna 1602 is connected to the integrated circuit 1601. Reference numerals 1603 and 1604 refer to a substrate and a cover material, respectively. The rectifier circuit of the present invention is included in the integrated circuit 1601. The integrated circuit 1601 is formed over the substrate 1603, and the cover material 1604 overlaps the substrate 1603 so as to cover the integrated circuit 1601 and the antenna 1602. Note that the antenna 1602 may be formed over the substrate 1603 or formed separately to be attached to the substrate 1603 after the integrated circuit 1601 is formed.

Figure 10B:
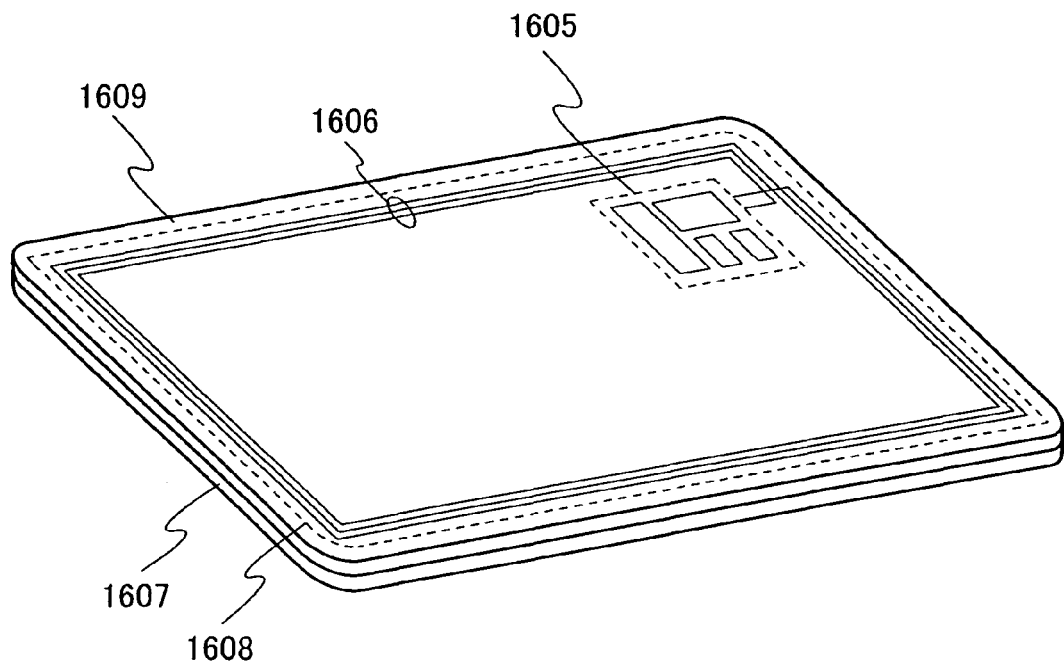

FIG. 10B is a perspective view showing one mode of the semiconductor device of the present invention, which is formed into a card. Reference numerals 1605 and 1606 refer to an integrated circuit and an antenna respectively, and the antenna 1606 is connected to the integrated circuit 1605. Reference numeral 1608 refers to a substrate functioning as an inlay sheet, and reference numerals 1607 and 1608 refer to cover materials. The integrated circuit 1605 and the antenna 1606 are formed over the substrate 1608, and the substrate 1608 is interposed between the cover materials 1607 and 1609.

Note that FIGS. 10A and 10B show cases where the antenna 1602 and the antenna 1606 have coil shapes; however, the shape of the antenna used in the present invention is not limited to this. When communication is performed using an electric field instead of a magnetic field, the antenna 1602 and the antenna 1606 do not necessarily have coil shapes.

All components including the variable capacitor in the rectifier circuit of the present invention can be formed through the normal MOS process. Therefore, the rectifier circuit and also a semiconductor device using the rectifier circuit can be reduced in size.

Embodiment 7

Subsequently, a method for manufacturing the semiconductor device of the present invention is specifically described. Note that in this embodiment, a thin film transistor (TFT) is adopted as an example of a semiconductor element; however, the semiconductor element used in the semiconductor device of the present invention is not limited to this. For example, a memory element, a diode, a resistor, a coil, a capacitor, or an inductor can be used instead of a TFT.

First, as shown in FIG. 12A, an insulating film 301, a release layer 302, an insulating film 303 functioning as a base film, and a semiconductor film 304 are formed in sequence over a substrate 300 having heat resistance. The insulating film 301, the release layer 302, the insulating film 303, and the semiconductor film 304 can be consecutively formed.

As the substrate 300, a glass substrate such as barium borosilicate glass or aluminoborosilicate glass, a quartz substrate, a ceramic substrate, or the like can be used. Alternatively, a metal substrate including a stainless steel substrate or a semiconductor substrate such as a silicon substrate may be used. A substrate formed of a synthetic resin having flexibility, such as plastic, generally tends to have lower allowable temperature limit than the above substrates; however, the substrate can be used as long as it can resist a processing temperature in manufacturing steps.

As a plastic substrate, polyester typified by polyethylene terephthalate (PET); polyether sulfone (PES); polyethylene naphthalate (PEN); polycarbonate (PC); nylon; polyether etherketone (PEEK); polysulfone (PSF); polyether imide (PEI); polyarylate (PAR); polybutylene terephthalate (PBT); polyimide; an acrylonitrile butadiene styrene resin; polyvinyl chloride; polypropylene; polyvinyl acetate; an acrylic resin; or the like can be used.

Note that, in this embodiment, the release layer 302 is provided over an entire surface of the substrate 300; however, the present invention is not limited to this structure. For example, the release layer 302 may be partially formed over the substrate 300 by a photolithography method or the like.

The insulating film 301 and the insulating film 303 are formed using an insulating material such as silicon oxide, silicon nitride ($SiN_x$, $Si_3N_4$, or the like), silicon oxynitride ($SiO_xN_y$) (x>y>0), or silicon nitride oxide ($SiN_xO_y$) (x>y>0) by a CVD method, a sputtering method, or the like.

The insulating film 301 and the insulating film 303 are provided to prevent an alkali metal such as Na or an alkaline earth metal contained in the substrate 300 from diffusing into the semiconductor film 304 and having an adverse effect on a characteristic of a semiconductor element such as a TFT. In addition, the insulating film 303 prevents an impurity element contained in the release layer 302 from diffusing into the semiconductor film 304 and has a role of protecting the semiconductor element during a subsequent step of releasing the semiconductor element.

Each of the insulating film 301 and the insulating film 303 may be formed to have either a single-layer structure or a staked-layer structure in which a plurality of insulating films are stacked. In this embodiment, a silicon oxynitride film with a thickness of 100 nm, a silicon nitride oxide film with a thickness of 50 nm, and a silicon oxynitride film with a thickness of 100 nm are sequentially stacked to form the insulating film 303. However, the material, the thickness, and the number of stacked layers of each film are not limited thereto. For example, instead of the silicon oxynitride film, which is a lower layer, a siloxane-based resin may be formed to a thickness of 0.5 to 3 μm by a spin coating method, a slit coating method, a droplet discharging method, a printing method, or the like. Instead of the silicon nitride oxide film, which is a middle layer, a silicon nitride film ($SiN_x$, $Si_3N_4$, or the like) may be used. Instead of the silicon oxynitride film, which is an upper layer, a silicon oxide film may be used. It is desirable that a thickness of each film be 0.05 to 3 μm, and the thickness can be freely selected in this range.

Alternatively, the lower layer of the insulating film 303, which is closest to the release layer 302, may be formed of a silicon oxynitride film or a silicon oxide film, the middle layer may be formed of a siloxane-based resin, and the upper layer may be formed of a silicon oxide film.

Note that the siloxane-based resin corresponds to a resin including a Si—O—Si bond, which is formed using a siloxane-based material as a starting material. The siloxane-based resin may have at least one of fluorine, an alkyl group, and aromatic hydrocarbon besides hydrogen as a substituent.

The silicon oxide film can be formed using a mixed gas of $SiH_4$ and $O_2$, TEOS (tetraethoxysilane) and $O_2$, or the like by a method such as thermal CVD, plasma CVD, normal pressure CVD, or bias ECRCVD. Further, the silicon nitride film can be formed typically using a mixed gas of $SiH_4$ and $NH_3$ by plasma CVD. Furthermore, the silicon oxynitride film and the silicon nitride oxide film can be formed typically using a mixed gas of $SiH_4$ and $N_2O$ by plasma CVD.

For the release layer 302, a metal film, a metal oxide film, or a film in which a metal film and a metal oxide film are stacked can be used. A metal film and a metal oxide film each may have either a single-layer structure or a stacked-layer structure in which a plurality of layers are stacked. Alternatively, metal oxide or metal oxynitride may be used instead of a metal film or a metal oxide film. The release layer 302 can be formed by a sputtering method or various CVD methods such as a plasma CVD method.

As a metal used for the release layer 302, tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), or the like can be used. Alternatively, for the release layer 302, a film formed of an alloy containing any of the above metals as its main component or a film formed of a compound containing any of the above metals may be used instead.

For the release layer 302, a film formed of silicon (Si) itself or a film formed of a compound containing silicon (Si) as a main component may be used. Alternatively, a film formed of silicon (Si) and an alloy containing any of the above metals may be used. A film containing silicon may be any of amorphous, microcrystalline, or polycrystalline.

The release layer 302 may have a single-layer structure of one of the above films or a stacked-layer structure in which a plurality of the above films are stacked. In order to obtain the release layer 302 formed by stacking a metal film and a metal oxide film, a metal film which is formed as a base film and then a surface thereof is oxidized or nitrided. Specifically, the metal film as a base film may be subjected to a plasma treatment in an oxygen atmosphere or an $N_2O$ atmosphere or may be subjected to a thermal treatment in an oxygen atmosphere or an $N_2O$ atmosphere. Alternatively, oxidation may be performed by forming a silicon oxide film or a silicon oxynitride film so as to be in contact with the metal film as a base film. Alternatively, nitridation may be performed by forming a silicon nitride oxide film or a silicon nitride film so as to be in contact with the metal film as a base film.

As a plasma treatment for oxidation or nitridation of the metal film, a high-density plasma treatment with a plasma density of $1 \times 10^{11}$ cm$^{-3}$ or more, more preferably, $1 \times 10^{11}$ cm$^{-3}$ to $9 \times 10^{15}$ cm$^{-3}$, and a high frequency wave such as a microwave (for example, a frequency of 2.45 GHz) may be performed.

Note that the release layer 302 in which a metal film and a metal oxide film are stacked may be formed by oxidizing a surface of a metal base film; however, a metal oxide film may be separately formed after formation of a metal film.

In a case of using tungsten as a metal, for example, a tungsten film is formed as the metal film which is the base film by a sputtering method, a CVD method, or the like and then the tungsten film is subjected to a plasma treatment. Accordingly, the tungsten film corresponding to a metal film and a metal oxide film formed of an oxide of tungsten, which is in contact with the metal film, can be formed.

Note that an oxide of tungsten is expressed by $WO_x$, and x is 2 to 3. There are cases in which x=2 ($WO_2$), x=2.5 ($W_2O_5$), x=2.75 ($W_4O_{11}$), and x=3 ($WO_3$). In a case of forming an oxide of tungsten, the value of x described above is not particularly restricted and may be set based on an etching rate or the like.

It is desirable that, after forming the insulating film 303, the semiconductor film 304 be formed without being exposed to the air. The thickness of the semiconductor film 304 is 20 to 200 nm (desirably, 40 to 170 nm, preferably, 50 to 150 nm). Note that the semiconductor film 304 may be an amorphous semiconductor or a polycrystalline semiconductor. Not only silicon but also silicon germanium can be used for the semiconductor. In a case of using silicon germanium, a concentration of germanium is preferably approximately 0.01 to 4.5 atomic %.

Note that the semiconductor film 304 may be crystallized by a known technique. As the known crystallization method, a laser crystallization method using laser light or a crystallization method using a catalytic element may be used. Alternatively, a crystallization method using a catalytic element and a laser crystallization method may be used in combination. In a case of using a substrate superior in heat resistance, such as quartz, as the substrate 300, a crystallization method which freely combines a thermal crystallization method using an electrically-heated furnace, a lump anneal crystallization method using infrared light, a crystallization method using a catalytic element, and a high-temperature annealing at approximately 950° C. may be used.

For example, in a case of using laser crystallization, a thermal treatment for four hours at 500° C. is performed to the semiconductor film 304 before laser crystallization in order to improve resistance of the semiconductor film 304 with respect to laser. By using a solid state laser capable of continuous oscillation and irradiating the semiconductor film 304 with laser light of a second to fourth harmonic thereof, large grain crystals can be obtained. Typically, a second harmonic (532 nm) or a third harmonic (355 nm) of an Nd:$YVO_4$ laser (fundamental wave is 1064 nm) is desirably used. Specifically, laser light emitted from a continuous-wave $YVO_4$ laser is converted into a harmonic by using a non-linear optical element, thereby obtaining laser light of which output is 10 W. Then, the laser light is preferably shaped into a rectangular or elliptical shape on an irradiated surface by an optical system, for the irradiation of the semiconductor film 304. The power density at this time needs to be approximately 0.01 to 100 MW/cm$^2$ (preferably, 0.1 to 10 MW/cm$^2$). In addition, the scan rate is set at approximately 10 to 2000 cm/sec.

Note that as a continuous oscillation gas laser, an Ar laser, a Kr laser, or the like can be used. Further, as a continuous oscillation solid-state laser, a YAG laser, a $YVO_4$ laser, a YLF laser, a $YAlO_3$ laser, a forsterite ($Mg_2SiO_4$) laser, a $GdVO_4$ laser, a $Y_2O_3$ laser, a glass laser, a ruby laser, an alexandrite laser, a Ti:sapphire laser, or the like can be used.

As a pulse-oscillation laser, an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti:sapphire laser, a copper-vapor laser, or a gold-vapor laser can be used.

The laser crystallization may be performed by pulsed-oscillation laser light at a repetition rate of greater than or equal to 10 MHz, which is a considerably higher frequency band than a generally used frequency band of several ten to several hundred Hz. It is said that the time between irradiation with pulsed-oscillation laser light and complete solidification of the semiconductor film 304 is several ten to several hundred nsec. Therefore, by using the above frequency band, the semiconductor film 304 can be irradiated with laser light of the next pulse until the semiconductor film is solidified after being melted by laser light of the preceding pulse. Therefore, since a solid-liquid interface can be continuously moved in the semiconductor film 304, the semiconductor film 304 having crystal grains that have grown continuously in a scanning direction is formed. Specifically, an aggregate of contained crystal grains having widths of 10 to 30 µm in the scanning direction and widths of approximately 1 to 5 µm in the direction perpendicular to the scanning direction can be formed. By forming single crystal grains which grow continuously along the scanning direction, a semiconductor film 304 which has almost no crystal boundary at least in a channel direction of a TFT can be formed.

Note that the laser crystallization may be performed by irradiation with continuous wave laser light of a fundamental wave and continuous wave laser light of a harmonic in parallel or irradiation with continuous wave laser light of a fundamental wave and pulse-oscillation laser light of a harmonic in parallel.

Note that laser light irradiation may be performed in an inert gas atmosphere of rare gas, nitrogen, or the like. Thus, roughness of a semiconductor surface due to laser light irradiation can be prevented, and variation of a threshold due to variation of an interface state density can be suppressed.

By irradiation with the above laser light, the semiconductor film 304 with higher crystallinity can be formed. Note that for the semiconductor film 304, a polycrystalline semiconductor formed by a sputtering method, a plasma CVD method, a thermal CVD method, or the like may be used.

The semiconductor film 304 is crystallized in this embodiment; however, an amorphous silicon semiconductor film or a microcrystalline semiconductor film may be directly subjected to a process described below without being crystallized. A TFT using an amorphous semiconductor or a microcrystalline semiconductor has advantages of lower cost and higher yield because it needs fewer manufacturing steps than a TFT using a polycrystalline semiconductor.

An amorphous semiconductor can be obtained by glow discharge decomposition of a gas containing silicon. As the gas containing silicon, $SiH_4$ and $Si_2H_6$ are given. The gas containing silicon diluted with hydrogen or hydrogen and helium may be used.

Next, as shown in FIG. 12B, the semiconductor film 304 is processed (patterned) to have a predetermined shape, so that island-shaped semiconductor films 305 to 307 are formed. Then, a gate insulating film 308 is formed so as to cover the island-shaped semiconductor films 305 to 307. The gate insulating film 308 can be formed to have a single-layer structure or a stacked-layer structure of a film containing silicon nitride, silicon oxide, silicon nitride oxide, or silicon oxynitride by a plasma CVD method, a sputtering method, or the like. In the case of the stacked-layer structure, a three-layer structure is preferably adopted for example, where a silicon oxide film, a silicon nitride film, and a silicon oxide film are sequentially stacked from the substrate 300 side.

The gate insulating film 308 may be formed by performing a high-density plasma treatment to the island-shaped semiconductor films 305 to 307 to oxidize or nitride the surfaces thereof. The high-density plasma treatment is performed using a mixed gas of a rare gas such as He, Ar, Kr, or Xe and oxygen, nitrogen oxide, ammonia, nitrogen, hydrogen, or the like. When excitation of the plasma in this case is performed by introduction of a microwave, high density plasma can be generated at a low electron temperature. By oxidizing or nitriding the surfaces of the semiconductor films by an oxygen radical (there is a case where an OH radical is included) or a nitrogen radical (there is a case where an NH radical is included) generated by such high density plasma, an insulating film with a thickness of 1 to 20 nm, typically 5 to 10 nm is formed so as to be in contact with the semiconductor film. The 5 to 10 nm thick insulating film is used as the gate insulating film 308.

Oxidation or nitridation of the semiconductor films by the above high-density plasma treatment proceeds due to a solid-phase reaction; therefore, interface state density between the gate insulating film and the semiconductor films can be extremely reduced. Further, since the semiconductor films are directly oxidized or nitrided by the high-density plasma treatment, variation in thickness of the insulating film to be formed can be suppressed. In a case where the semiconductor films have crystallinity, by oxidizing surfaces of the semiconductor films due to a solid-phase reaction by the high-density plasma treatment, rapid oxidation can be prevented only in a crystal grain boundary, and thus a gate insulating film with good uniformity and low interface state density can be formed. When a transistor in which a gate insulating film partially or entirely includes the insulating film formed by high-density plasma treatment is used, variations in characteristics thereof can be suppressed.

Next, as shown in FIG. 12C, a conductive film is formed over the gate insulating film 308 and then the conductive film is processed (patterned) to have a predetermined shape, so that a gate electrode 309 is formed above the island-shaped semiconductor films 305 to 307. In this embodiment, stacked two conductive films are patterned to form the gate electrode 309. The conductive film can be formed of tantalum (Ta), tungsten (W), titanium (Ti), molybdenum (Mo), aluminum (Al), copper (Cu), chromium (Cr), niobium (Nb), or the like; an alloy containing any of the above metals as its main component; or a compound containing any of the above metals. Alternatively, the conductive film may be formed of a semiconductor such as polycrystalline silicon, in which a semiconductor film is doped with an impurity element such as phosphorus imparting conductivity.

In this embodiment, a tantalum nitride film or a tantalum (Ta) film is used for a first conductive film, and a tungsten (W) film is used for a second conductive film. As a combination of two conductive films, a tungsten nitride film and a tungsten film, a molybdenum nitride film and a molybdenum film, an aluminum film and a tantalum film, an aluminum film and a titanium film, and the like are given as well as an example described in this embodiment. Since tungsten and tantalum nitride have high heat resistance, a thermal treatment for thermal activation can be performed in a step after two-layer conductive films are formed. In addition, as a combination of the second conductive film, NiSi (nickel silicide) and silicon doped with an impurity imparting n-type conductivity, WSix and silicon doped with an impurity imparting n-type conductivity, or the like may be used.

In this embodiment, the gate electrode 309 is formed of stacked two conductive films; however, this embodiment is not limited to this structure. The gate electrode 309 may be formed of a single conductive film or stacked three or more conductive films. In the case of a three-layer structure in which three or more conductive films are stacked, a stacked-layer structure of a molybdenum film, an aluminum film, and a molybdenum film is preferably employed.

The conductive film can be formed by a CVD method, a sputtering method, or the like. In this embodiment, the first conductive film is formed to a thickness of 20 to 100 nm, and the second conductive film is formed to a thickness of 100 to 400 nm.

Note that a mask of silicon oxide, silicon oxynitride, or the like may be used instead of a resist as a mask used when the gate electrode 309 is formed. In this case, a step of patterning the mask of silicon oxide, silicon oxynitride, or the like is additionally needed; however, the mask film is less reduced in etching as compared with the resist, and thus the gate electrode 309 with a desired width can be formed. Alternatively, the gate electrode 309 may be selectively formed by a droplet discharging method without a mask.

Note that a droplet discharging method means a method in which droplets containing a predetermined composition are discharged or ejected from fine pores to form a predetermined pattern, and includes an ink-jet method and the like.

Next, an impurity element imparting n-type conductivity (typically, P (phosphorous) or As (arsenic)) is doped into the island-shaped semiconductor films 305 to 307 at low concentration with the gate electrode 309 used as a mask (first doping step). The first doping step is performed under the following condition: a dose amount of $1 \times 10^{15}$ to $1 \times 10^{19}/cm^3$ and an accelerated voltage of 50 to 70 keV; however, the present invention is not limited thereto. In the first doping step, doping is performed through the gate insulating film 308 to form a pair of low concentration impurity regions 310 in each of the island-shaped semiconductor films 305 to 307. Note that the first doping step may be performed covering the island-shaped semiconductor film 305 to be a p-channel TFT with the mask.

Figure 13A:
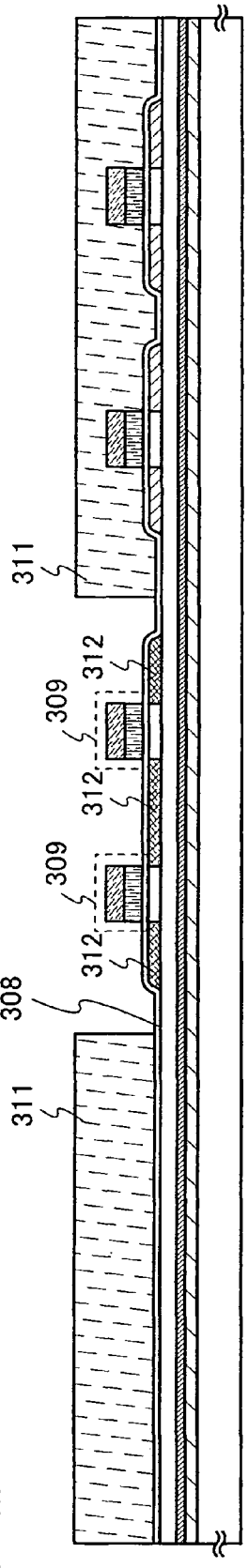
FIGS. 13A to 13C are diagrams showing a method for manufacturing a semiconductor device of the present invention.

Next, as shown in FIG. 13A, a mask 311 is formed so as to cover the island-shaped semiconductor films 306 and 307 to be n-channel TFTs. An impurity element imparting p-type conductivity (typically B (boron)) is doped into the island-shaped semiconductor film 305 at high concentration with the gate electrode 309 as well as the mask 311 used as masks (second doping step). The second doping step is performed under the following condition: a dose amount of $1 \times 10^{19}$ to $1 \times 10^{20}/cm^3$ and an accelerated voltage of 20 to 40 keV. In the second doping step, doping is performed through the gate insulating film 308 to form p-type high concentration impurity regions 312 in the island-shaped semiconductor film 305.

Figure 13B:
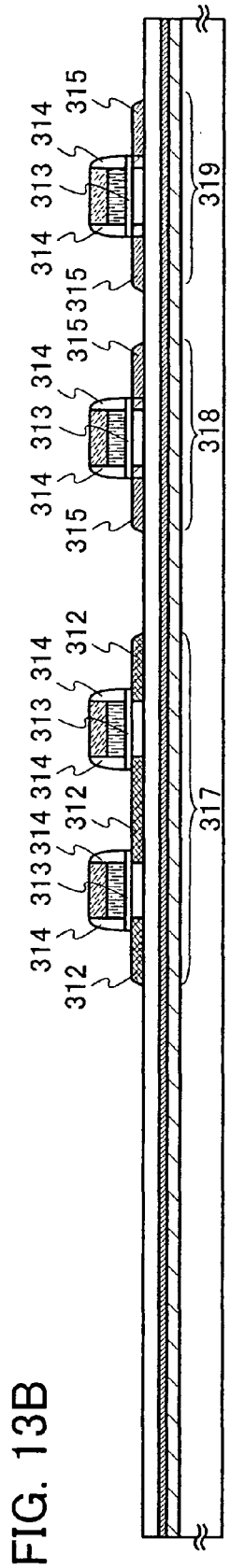

Next, as shown in FIG. 13B, after the mask 311 is removed by ashing or the like, an insulating film is formed so as to cover the gate insulating film 308 and the gate electrode 309. The insulating film is formed to have a single-layer structure or a stacked-layer structure of a silicon film, a silicon oxide film, a silicon oxynitride film, a silicon nitride oxide film, and a film containing an organic material such as an organic resin by a plasma CVD method, a sputtering method, or the like. In this embodiment, a silicon oxide film with a thickness of 100 nm is formed by a plasma CVD method.

Next, the gate insulating film 308 and the insulating film are partially etched by anisotropic etching which mainly etches in a perpendicular direction. By the anisotropic etching, the gate insulating film 308 is partially etched to form a gate insulating film 313 partially formed over the island-shaped semiconductor films 305 to 307. In addition, by the anisotropic etching, the insulating film is partially etched to form a sidewall 314 which is in contact with a side surface of the gate electrode 309. The sidewall 314 is used for a mask for doping when an LDD (Lightly Doped Drain) region is formed. In this embodiment, a mixed gas of $CHF_3$ and He is used as an etching gas. Note that a process for forming the sidewall 314 is not limited thereto.

Next, a mask is formed so as to cover the island-shaped semiconductor film 305 to be a p-channel TFT. An impurity element imparting n-type conductivity (typically, P or As) is doped at high concentration with the gate electrode 309 and the sidewall 314 as well as the formed mask used as masks (third doping step). The third doping step is performed under the following condition: a dose amount of $1 \times 10^{19}$ to $1 \times 10^{20}/cm^3$ and an accelerated voltage of 60 to 100 keV. In the third doping step, a pair of n-type high concentration impurity regions 315 are formed in each of the island-shaped semiconductor films 306 and 307.

Note that the above sidewall 314 is doped with an impurity imparting n-type conductivity at high concentration in a subsequent step, which functions as a mask when a low concentration impurity region or a non-doped offset region is formed under the sidewall 314. Therefore, in order to control a width of the low concentration impurity region or the offset region, a condition of anisotropic etching in forming the sidewall 314 or thickness of the insulating film for forming the sidewall 314 may be appropriately changed so that the size of the sidewall 314 is adjusted.

After the mask is removed by ashing or the like, heat activation of the impurity region may be performed. For example, a silicon oxynitride film is formed to a thickness of 50 nm, and then a heat treatment may be performed at 550° C. for 4 hours in a nitrogen atmosphere.

Alternatively, after a silicon nitride film containing hydrogen is formed to a thickness of 100 nm, a heat treatment may be performed in a nitrogen atmosphere at a temperature of 410° C. for 1 hour to hydrogenate the island-shaped semiconductor films 305 to 307. Further alternatively, a heat treatment may be performed in an atmosphere containing hydrogen at a temperature of 300 to 450° C. for 1 to 12 hours to hydrogenate the island-shaped semiconductor films 305 to 307. For the heat treatment, thermal annealing, a laser annealing method, an RTA method, or the like may be adopted. By the heat treatment, activation of the impurity element added to the semiconductor films can be performed as well as hydrogenation. As another means for the hydrogenation, plasma hydrogenation (using hydrogen that is excited by plasma) may be performed. In the hydrogenation process, a dangling bond can be terminated by using the thermally excited hydrogen.

Through the above steps, n-channel TFTs 318 and 319 and a p-channel TFT 317 are formed.

Figure 13C:
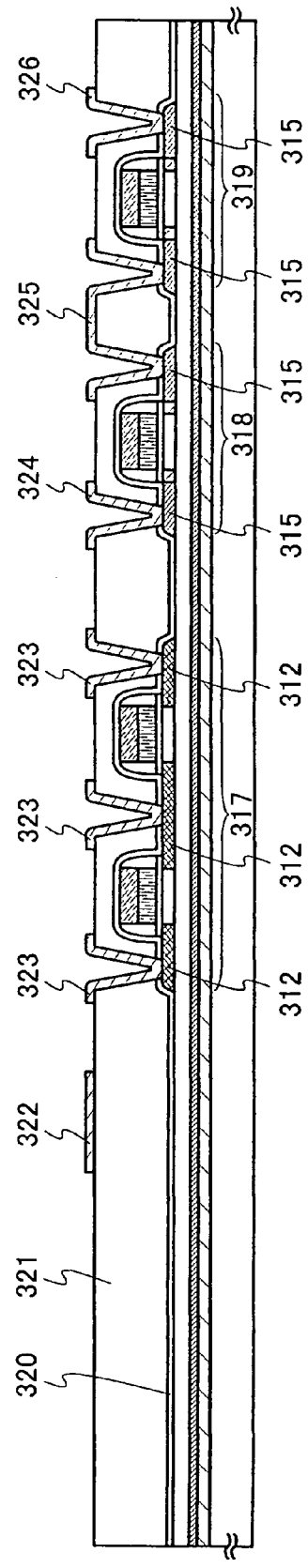

Next, as shown in FIG. 13C, an insulting film 320 functioning as a passivation film for protecting the TFTs 317 to 319 is formed. The insulating film 320 is not necessarily provided; however, by forming the insulating film 320, an impurity such as alkali metal or alkaline earth metal can be prevented from entering the TFTs 317 to 319. Specifically, silicon nitride, silicon nitride oxide, aluminum nitride, aluminum oxide, silicon oxide, or the like is desirably used for the insulating film 320. In this embodiment, a silicon oxynitride film with a thickness of approximately 600 nm is used as the insulating film 320. In this case, the hydrogenation process described above may be performed after formation of the silicon oxynitride film.

Next, an insulating film 321 is formed over the insulating film 320 so as to cover the TFTs 317 to 319. For the insulating film 321, an organic material having heat resistance such as polyimide, acrylic, benzocyclobutene, polyamide, or epoxy can be used. Alternatively, a low-dielectric constant material (Low-k material), a siloxane resin, silicon oxide, silicon nitride, silicon oxynitride, silicon nitride oxide, PSG (phosphosilicate glass), BPSG (borophosphosilicate glass), alumina, or the like may be used. A siloxane resin may contain at least one of fluorine, an alkyl group, and aromatic hydrocarbon besides hydrogen as a substituent. Note that the insulating film 321 may be formed by stacking a plurality of insulating films formed of any of the above materials.

The insulating film 321 can be formed by a CVD method, a sputtering method, an SOG method, spin coating, dipping, spray coating, a droplet discharging method (an ink-jet method, screen printing, offset printing, or the like), a doctor knife, a roll coater, a curtain coater, a knife coater, or the like depending on a material of the insulating film 321.

Next, contact holes are formed in the insulating film 320 and the insulating film 321 so that each of the island-shaped semiconductor films 305 to 307 is partially exposed. Then, a conductive film 322 and conductive films 323 to 326 which are in contact with the island-shaped semiconductor films 305 to 307 through the contact holes are formed. As an etching gas for forming the contact holes, a mixed gas of $CHF_3$ and He is employed; however, the present invention is not limited thereto.

The conductive films 322 to 326 can be formed by a CVD method, a sputtering method, or the like. Specifically, for the conductive films 322 to 326, aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or the like, or an alloy containing any of the above metals as its main component or a compound containing any of the above metals can be used. The conductive films 322 to 326 can be formed to have a single-layer structure or stacked-layer structure of a film using any of the above metals.

As examples of an alloy containing aluminum as its main component, an alloy containing aluminum as its main component and also containing nickel, an alloy containing aluminum as its main component and also containing nickel and one or both of carbon and silicon are given. Aluminum and aluminum silicon are optimal for a material for forming the conductive films 322 to 326 because they have low resistance and are inexpensive. In particular, an aluminum silicon (Al—Si) film can prevent generation of a hillock in resist baking when the conductive films 322 to 326 are pattered, compared to an aluminum film. Cu may be mixed by approximately 0.5% instead of silicon (Si).

For the conductive films 322 to 326, for example, a stacked-layer structure of a barrier film, an aluminum silicon (Al—Si) film, and a barrier film or a stacked-layer structure of a barrier film, an aluminum silicon (Al—Si) film, a titanium nitride film, and a barrier film is preferably used. Note that a barrier film is a film formed using titanium, an oxide of titanium, molybdenum, or a nitride of molybdenum. When barrier films are formed so as to interpose an aluminum silicon (Al—Si) film, generation of a hillock of aluminum or aluminum silicon can be further prevented. Further, when a barrier film is formed using titanium that is a highly-reducible element, even if a thin oxide film is formed over the island-shaped semiconductor films 305 to 307, the oxide film is reduced by titanium contained in the barrier film so that preferable contact between the conductive films 323 to 326 and the island-shaped semiconductor films 305 to 307 can be obtained. Alternatively, a plurality of barrier films may be stacked to be used. In that case, for example, the conductive films 322 to 326 can be each formed to have a five-layer structure in which titanium, titanium nitride, aluminum silicon, titanium, and titanium nitride are sequentially stacked.

Note that the conductive films 324 and 325 are connected to the high concentration impurity regions 315 of the n-channel TFT 318. The conductive films 325 and 326 are connected to the high concentration impurity regions 315 of the n-channel TFT 319. The conductive films 323 are connected to the high concentration impurity regions 312 of the p-channel TFT 317. In the p-channel TFT 317, all the impurity regions 312 are electrically connected by the conductive films 323. In the p-channel TFT 317, two gate electrodes 309 are electrically connected and function as MOS varactors.

Next, as shown in FIG. 14A, an insulating film 330 is formed so as to cover the conductive films 322 to 326, and thereafter a contact hole is formed in the insulating film 330 so that part of the conductive film 322 is exposed. Then, a conductive film 331 is formed in the contact hole so as to be in contact with the conductive film 322. Any material can be used as a material for the conductive film 331 as long as it is a material which can be used for the conductive films 322 to 326.

The insulating film 330 can be formed using an organic resin film, an inorganic insulating film, or a siloxane-based insulating film. For an organic resin film, acrylic, epoxy, polyimide, polyamide, polyvinylphenol, benzocyclobutene, or the like can be used. As an inorganic insulating film, a film containing silicon oxide, silicon oxynitride, silicon nitride oxide, or carbon typified by DLC (Diamond Like Carbon), or the like can be used. Note that a mask used for forming an opening by a photolithography method can be formed by a droplet discharging method or a printing method. In addition, the insulating film 330 can be formed by a CVD method, a sputtering method, a droplet discharging method, or a printing method depending on a material of the insulating film 330.

Next, a conductive film 332 functioning as an antenna is formed so as to be partially contact with the conductive film 331. The conductive film 332 can be formed using a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), Zinc (Zn), Tin (Sn), or nickel (Ni). Alternatively, as the conductive film 332, a film formed of an alloy containing any of the above metals as its main component or a film formed of a compound containing any of the above metals may be used. The conductive film 332 can be formed to have a single-layer structure or stacked-layer structure of the above films.

The conductive films 332 can be formed by a CVD method, a sputtering method, a printing method such as screen printing or gravure printing, a droplet discharging method, a dispenser method, a plating method, a photolithography method, an evaporation method, or the like.

For example, in a case of using a screen printing method, the conductive film 332 can be formed by being selectively printed over the insulating film 330 with a conductive paste in which conductive particles each having a grain size of several nm to several tens of μm are dispersed in an organic resin. The conductive particle can be formed using silver (Ag), gold (Au), copper (Cu), nickel (Ni), platinum (Pt), palladium (Pd), tantalum (Ta), molybdenum (Mo), tin (Sn), lead (Pb), zinc (Zn), chromium (Cr), titanium (Ti) or the like. Alternatively, the conductive particle can be formed of an alloy containing any of the above metals as its main component or a compound containing any of the above metals. Alternatively, a fine particle or a dispersive nanoparticle of silver halide may be used. As an organic resin contained in the conductive paste, polyimide, a siloxane-based resin, an epoxy resin, a silicon resin, or the like can be used.

As examples of an alloy of the above metals, combinations of silver (Ag) and palladium (Pd), silver (Ag) and platinum (Pt), gold (Au) and platinum (Pt), gold (Au) and palladium (Pd), and silver (Ag) and copper (Cu) are given. Alternatively, a conductive particle in which copper (Cu) is coated with silver (Ag), or the like may be used.

When forming the conductive film 332, baking is preferably performed after the conductive paste is applied by a printing method or a droplet discharging method. For example, in a case where conductive particles (of which grain size is greater than or equal to 1 nm and less than or equal to 100 nm) containing silver as its main component are used for the conductive paste, the conductive paste is baked at a temperature of 150 to 300° C. and thus the conductive film 332 can be obtained. Baking may be performed by lamp annealing using an infrared lamp, a xenon lamp, a halogen lamp, or the like, furnace annealing using an electric furnace, or a laser annealing method using an excimer laser or an Nd:YAG laser. Alternatively, a fine particle containing solder or lead-free solder as its main component may be used. In this case, it is preferable to use a fine particle having a grain size of 20 μm or less. Solder and lead-free solder have an advantage such as low cost.

When a printing method or a droplet discharging method is used, the conductive film 332 can be formed without using a mask for exposure. In addition, when a printing method or a droplet discharging method is used, waste of a material which would be removed by etching can be avoided unlike in the case of a photolithography method. Further, since an expensive mask for exposure is not necessarily used, the cost spent on the manufacturing of a semiconductor device can be reduced.

Next, as shown in FIG. 14B, an insulating film 333 is formed over the insulating film 330 so as to cover the conductive films 331 and 332. The insulating film 333 can be formed using an organic resin film, an inorganic insulating film, or a siloxane-based insulating film. For an organic resin film, acrylic, epoxy, polyimide, polyamide, polyvinylphenol, benzocyclobutene, or the like can be used. As an inorganic insulating film, a film containing silicon oxide, silicon oxynitride, silicon nitride oxide, or carbon typified by DLC (Diamond Like Carbon), or the like can be used. Note that a mask used for forming an opening by a photolithography method can be formed by a droplet discharging method or a printing method. In addition, the insulating film 333 can be formed by a CVD method, a sputtering method, a droplet discharging method, or a printing method depending on a material of the insulating film 333.

Next, as shown in FIG. 15A, a layer including semiconductor elements typified by TFTs, which are insulating films 303 to 333, and various conductive films (hereinafter referred to as an element formation layer 334) is released from the substrate 300. In this embodiment, a first sheet material 335 is attached to a surface on the insulating film 333 side of the element formation layer 334, and then the element formation layer 334 is released from the substrate 300 by a physical force. The release layer 302 does not need to be completely removed and may be partially left.

The releasing may be performed by a method utilizing etching of the release layer 302. In this case, a trench is formed so that the release layer 302 is partially exposed. The trench is formed by dicing, scribing, processing using laser light including UV light, a photolithography method, or the like. It is only necessary that the trench be deep enough to expose the release layer 302. In addition, halogen fluoride is used as an etching gas, which is introduced from the trench. In this embodiment, for example, $ClF_3$ (chlorine trifluoride) is used under the following condition: a temperature of 350° C., a flow rate of 300 sccm, a pressure of 6 Torr, and a processing time of 3 hours. Alternatively, a mixed gas of nitrogen and $ClF_3$ may also be used. By using halogen fluoride such as $ClF_3$, the release layer 302 is selectively etched, so that the substrate 300 can be released from the TFTs 317 to 319. Note that halogen fluoride may be either gas or liquid.

Next, as shown in FIG. 15B, after a second sheet material 336 is attached to a surface exposed by the releasing of the element formation layer 334, the element formation layer 334 is released from the first sheet material 335.

Note that when a plurality of semiconductor elements corresponding to semiconductor devices are formed over the substrate 300, the element formation layer 334 is cut for each semiconductor device. A laser irradiation apparatus, a dicing apparatus, a scribing apparatus, or the like can be used for cutting.

Note that in this embodiment, an example in which an antenna and a semiconductor element are formed over one substrate is described; however, the present invention is not limited thereto. After formation of the semiconductor element, an antenna which is separately formed may be electrically connected to an integrated circuit. In this case, the antenna and the integrated circuit can be electrically connected to each other by being pressure-bonded with an anisotropic conductive film (ACF), anisotropic conductive paste (ACP), or the like. Alternatively, a conductive adhesive such as a silver paste, a copper paste, or a carbon paste; solder joint; or the like may be used for the connection.

Note that after the semiconductor device shown in FIG. 15B is completed, a third sheet material may be attached so as to cover the insulating film 333, and the second sheet material 336 and the third sheet material may be attached to each other by one or both of a thermal treatment and a pressure treatment. Hot melt films or the like may be used for the second sheet material 336 and the third sheet material. Alternatively, even in a case where the third material is not prepared, the first sheet material 335 and the second sheet material 336 may be attached to each other without releasing the first sheet material 335.

As the second sheet material 336 and the third sheet material, a film to which an antistatic treatment for preventing static electricity or the like is performed (hereinafter referred to as an antistatic film) may be used. The sealing is performed using the antistatic film, and therefore a semiconductor element can be prevented from being adversely affected due to external static electricity or the like when dealt with as a product.

For the antistatic film, a type in which a material which can prevent static charge (antistatic agent) is mixed into a film, a type in which a film itself prevents static charge, a type in which a film is coated with an antistatic agent, and the like are given. For the antistatic agent, nonionic polymers, anionic polymers, cationic polymers, nonionic surfactants, anionic surfactants, cationic surfactants, or amphoteric surfactants can be used. Alternatively, a metal, indium tin oxide (ITO), or the like may be used. In addition, for a material of the antistatic film, an olefin-based resin, an ABS resin, a styrene-based resin, a PMMA resin, a polycarbonate-based resin, a PVC polyester-based resin, a polyamide resin, a modified PPO resin, or the like can be used.

Note that this embodiment can be implemented in combination with any of the above embodiment modes and embodiments.

Embodiment 8

In this embodiment, an example of manufacturing the semiconductor device of the present invention with the use of a transistor formed over a single crystalline substrate is described. The transistor formed over a single crystalline substrate can suppress a variation in characteristics, and thus the number of transistors used for the semiconductor device can be reduced.

Figures 16A, 16B, 16C:
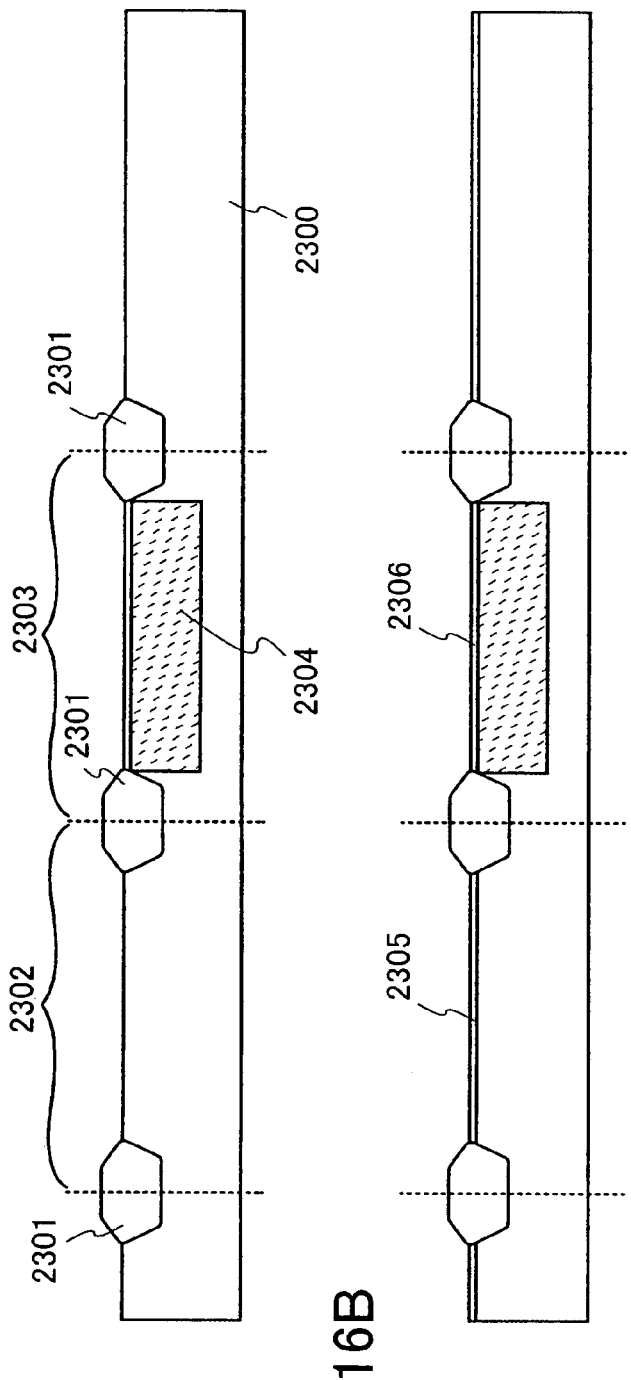
FIGS. 16A to 16C are diagrams showing a method for manufacturing a semiconductor device of the present invention.

First, as shown in FIG. 16A, an element isolation insulating film 2301 for electrically isolating a semiconductor element is formed of an insulating film, over a semiconductor substrate 2300. Formation of the element isolation insulating film 2301 makes it possible to electrically isolate a region for forming a transistor (element formation region) 2302 from an element formation region 2303.

As the semiconductor substrate 2300, an n-type or p-type single crystalline silicon substrate, a compound semiconductor substrate (a GaAs substrate, an InP substrate, a GaN substrate, a SiC substrate, a sapphire substrate, a ZnSe substrate, or the like), an SOI (Silicon On Insulator) substrate manufactured by a bonding method or a SIMOX (Separation by IMplanted OXygen) method, or the like can be used.

For formation of the element isolation insulating film 2301, a selective oxidation method (LOCOS (Local Oxidation of Silicon) method), a trench isolation method, or the like can be used.

Further, in this embodiment, an example in which an n-type single crystalline silicon substrate is used as the semiconductor substrate 2300 and a p-well 2304 is formed in the element formation region 2303 is described. The p-well 2304 formed in the element formation region 2303 of the semiconductor substrate 2300 can be formed by selective introduction of an impurity element imparting p-type conductivity into the element formation region 2303. As the impurity element imparting p-type conductivity, boron (B), aluminum (Al), gallium (Ga), or the like can be used. On the other hand, in the case where a p-type semiconductor substrate is used as the semiconductor substrate 2300, an n-well may be formed in the element formation region 2302 by selective introduction of an impurity element imparting n-type conductivity.

Note that although an impurity element is not introduced into the element formation region 2302 because the n-type semiconductor substrate is used as the semiconductor substrate 2300 in this embodiment, an n-well may be formed in the element formation region 2302 by introduction of an impurity element imparting n-type conductivity. As the impurity element imparting n-type conductivity, phosphorus (P), arsenic (As), or the like can be used.

Next, as shown in FIG. 16B, insulating films 2305 and 2306 are formed so as to cover the element formation regions 2302 and 2303, respectively. In this embodiment, the insulating films 2305 and 2306 may be formed of silicon oxide films formed in the element formation regions 2302 and 2303 by thermal oxidization of the semiconductor substrate 2300. Alternatively, the insulating films 2305 and 2306 may be formed to have a stacked-layer structure of a silicon oxide film and a silicon oxynitride film by forming the silicon oxide film by thermal oxidation and then nitriding a surface of the silicon oxide film by a nitridation treatment.

Further alternatively, the insulating films 2305 and 2306 may be formed using a plasma treatment as described above. For example, by oxidizing or nitriding the surfaces of the semiconductor substrate 2300 by a high-density plasma treatment, silicon oxide ($SiO_x$) films or silicon nitride ($SiN_x$) films to be used as the insulating films 2305 and 2306 can be formed in the element formation regions 2302 and 2303.

Next, as shown in FIG. 16C, a conductive film is formed so as to cover the insulating films 2305 and 2306. In this embodiment, an example in which a conductive film 2307 and a conductive film 2308 are sequentially stacked as the conductive film is described. The conductive film may be formed to have a single-layer structure or a staked-layer structure in which three or more conductive films are stacked.

The conductive films 2307 and 2308 can be formed of tantalum (Ta), tungsten (W), titanium (Ti), molybdenum (Mo), aluminum (Al), copper (Cu), chromium (Cr), niobium (Nb), or the like, a film formed of an alloy containing any of the above metals as its main component, or a film formed of a compound containing any of the above metals. Alternatively, a semiconductor material typified by polycrystalline silicon doped with an impurity element imparting conductivity, such as phosphorus, may be used. In this embodiment, the conductive film 2307 is formed using tantalum nitride and the conductive film 2308 is formed using tungsten.

Next, as shown in FIG. 17A, by processing (patterning) the conductive films 2307 and 2308 which are stacked to have predetermined shapes, gate electrodes 2309 and 2310 are formed over the insulating films 2305 and 2306.

Next, as shown in FIG. 17, a mask 2311 is selectively formed using a resist so as to cover the element formation region 2302 and an impurity element is introduced into the element formation region 2303. Since the gate electrode 2310 as well as the mask 2311 function as masks, by introduction of the impurity element, impurity regions 2312 functioning as source and drain regions and a channel formation region 2313 are formed in the p-well 2304. As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. In this embodiment, phosphorus (P) is used as the impurity element.

After the mask 2311 is removed, a mask 2314 is selectively formed using a resist so as to cover the element formation region 2303 and an impurity element is introduced into the element formation region 2302. Since the gate electrode 2309 as well as the mask 2314 function as masks, by introduction of the impurity element, impurity regions 2315 functioning as source and drain regions and a channel formation region 2316 are formed in the element formation region 2302 of the semiconductor substrate 2300. As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. In this embodiment, an impurity element imparting conductivity which is different from that of the impurity element introduced into the element formation region 2303 in FIG. 17B (for example, boron (B)) is introduced.

Figure 18A:
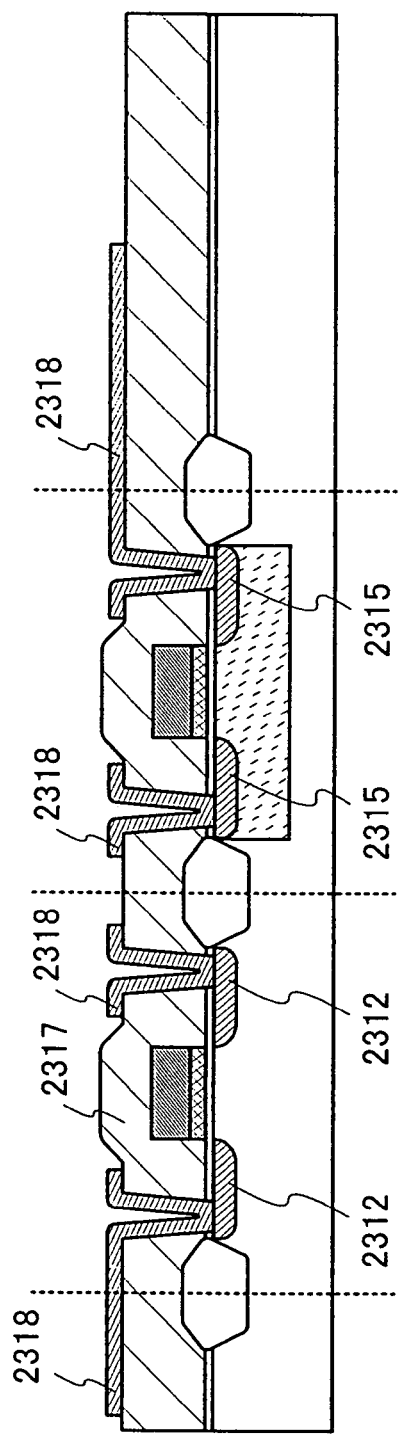
FIGS. 18A and 18B are diagrams showing a method for manufacturing a semiconductor device of the present invention.

Next, as shown in FIG. 18A, an insulating film 2317 is formed so as to cover the insulating films 2305 and 2306 and the gate electrodes 2309 and 2310, and thereafter a contact hole is formed in the insulating film 2317 so that the impurity regions 2312 and 2315 are partially exposed. Then, conductive films 2318 connected to the impurity regions 2312 and 2315 through the contact hole are formed. The conductive films 2318 can be formed by a CVD method, a sputtering method, or the like.

The insulating film 2317 can be formed using an inorganic insulating film, an organic resin film, or a siloxane-based insulating film. As an inorganic insulating film, a film containing silicon oxide, silicon oxynitride, silicon nitride oxide, or carbon typified by DLC (Diamond Like Carbon), or the like can be used. For an organic resin film, acrylic, epoxy, polyimide, polyamide, polyvinylphenol, benzocyclobutene, or the like can be used. In addition, the insulating film 2317 can be formed by a CVD method, a sputtering method, a droplet discharging method, or a printing method depending on a material of the insulating film 2317.

Note that a transistor used for the semiconductor device of the present invention is not limited to a structure shown in this embodiment. For example, an inversely-staggered structure may be adopted.

Figure 18B:
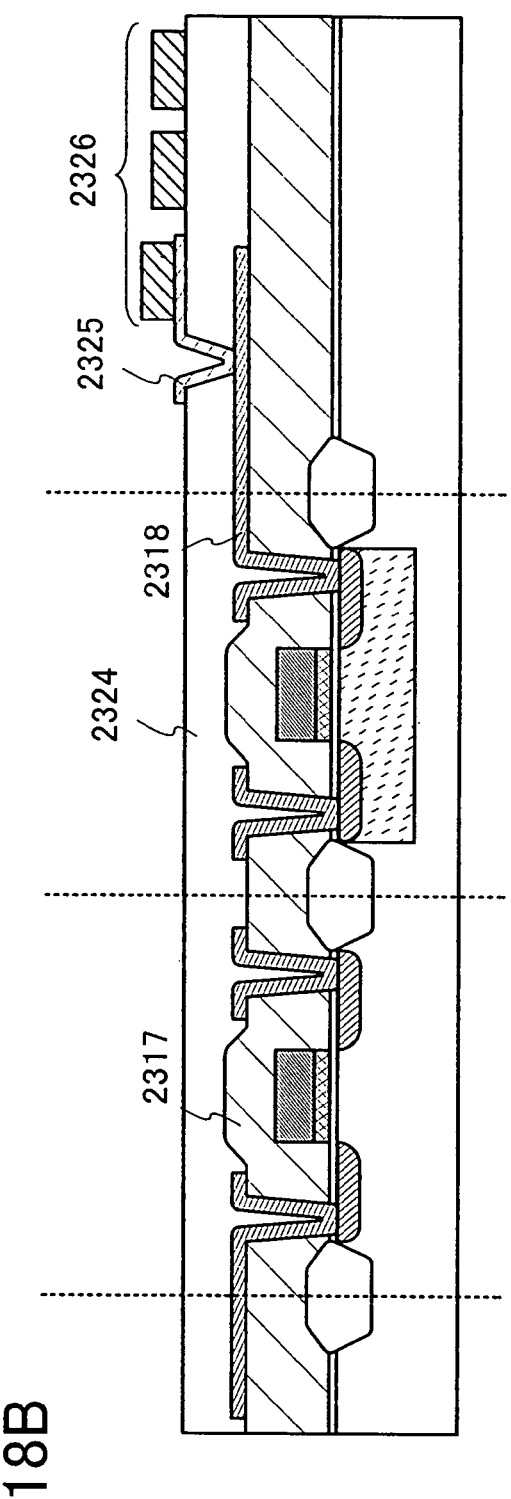
Figure 19A:
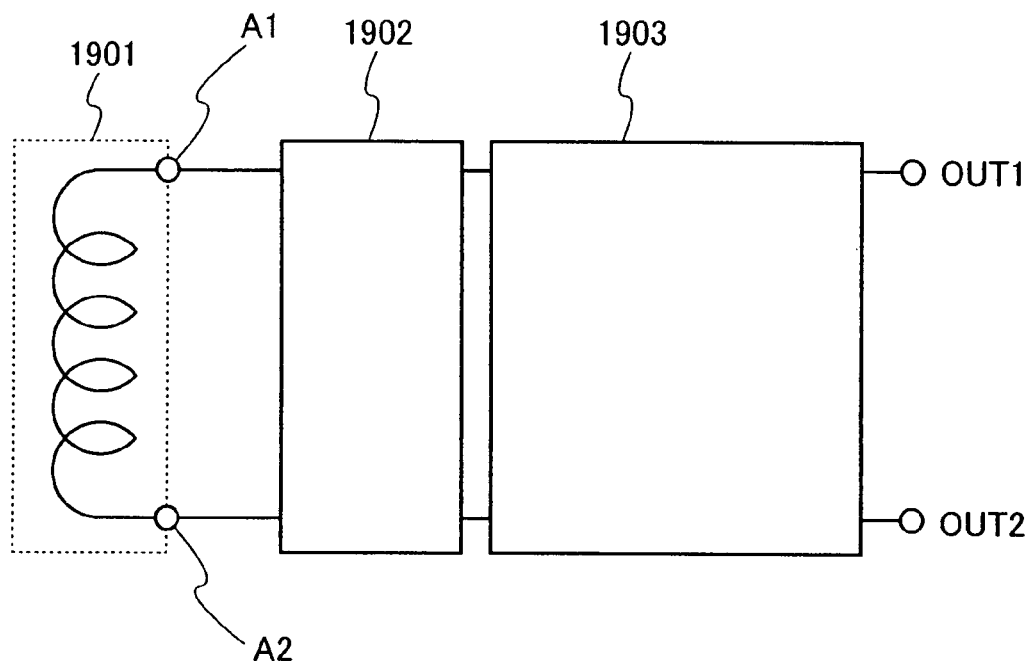
FIGS. 19A and 19B are diagrams each showing a structure of a conventional semiconductor device.
Figure 19B:
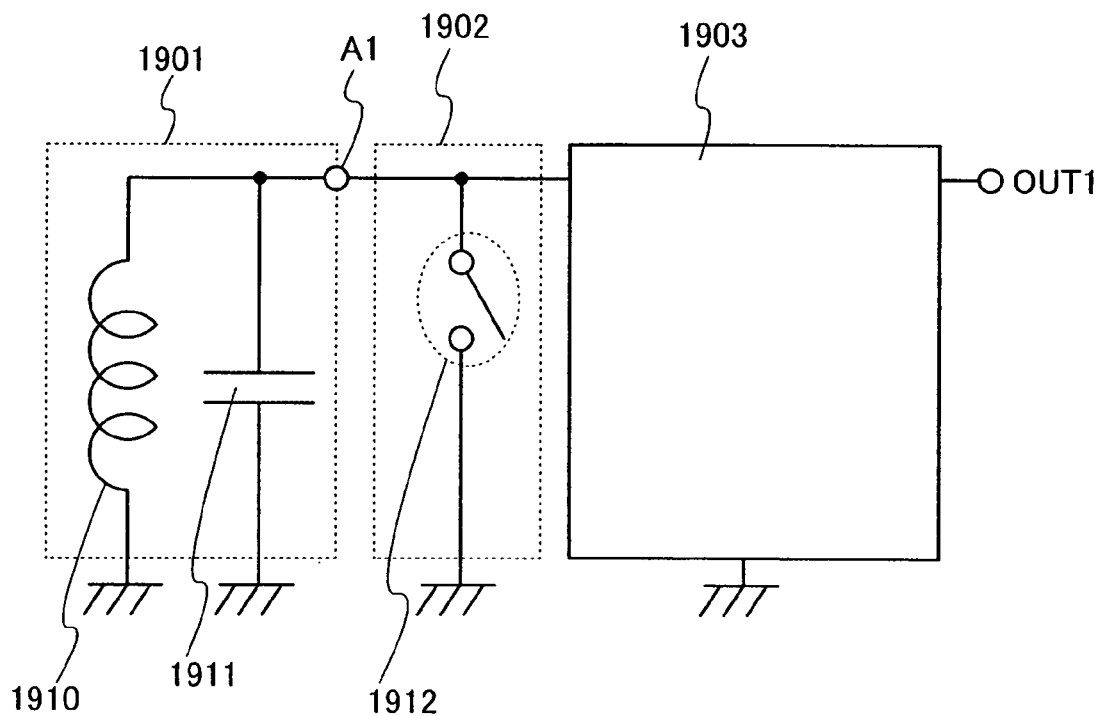

Next, as shown in FIG. 18B, an interlayer film 2324 is formed. Then, the interlayer film 2324 is etched to form a contact hole so that the conductive film 2318 is partially exposed. The interlayer film 2324 is not limited to a resin and may be any other film such as a CVD oxidation film; however, the interlayer film 2324 is desirably a resin in terms of planarity. Alternatively, a contact hole may be formed using a photosensitive resin without the etching. After that, a wiring 2325 in contact with the conductive film 2318 through the contact hole is formed over the interlayer film 2324.

Next, a conductive film 2326 functioning as an antenna is formed so as to be in contact with the wiring 2325. The conductive film 2326 can be formed using a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), Zinc (Zn), Tin (Sn), or nickel (Ni). Alternatively, as the conductive film 2326, a film formed of an alloy containing any of the above metals as its main component or a film formed of a compound containing any of the above metals may be used. The conductive film 2326 can be formed to have a single-layer structure or stacked-layer structure of the above films.

The conductive films 2326 can be formed by a CVD method, a sputtering method, a printing method such as screen printing or gravure printing, a droplet discharge method, a dispenser method, a plating method, a photolithography method, an evaporation method, or the like.

Note that in this embodiment, an example in which an antenna and a semiconductor element are formed over one substrate is described; however, the present invention is not limited thereto. After formation of the semiconductor element, an antenna which is separately formed may be electrically connected to an integrated circuit. In this case, the antenna and the integrated circuit can be electrically connected to each other by being pressure-bonded with an anisotropic conductive film (ACF), anisotropic conductive paste (ACP), or the like. Alternatively, a conductive adhesive such as a silver paste, a copper paste, or a carbon paste; solder joint; or the like may be used for the connection.

By using the above manufacturing method, the semiconductor device of the present invention can have a structure in which a transistor is formed over a semiconductor substrate and a thin film secondary battery is formed thereover. By the above structure, a semiconductor device which is further reduced in thickness and size can be provided.

Note that this embodiment can be implemented in combination with any of the above embodiment modes and embodiments.

Embodiment 9

In this embodiment, a structure of the rectifier circuit of the present invention shown in FIG. 3A is described with reference to a top plan view thereof.

Figure 11:
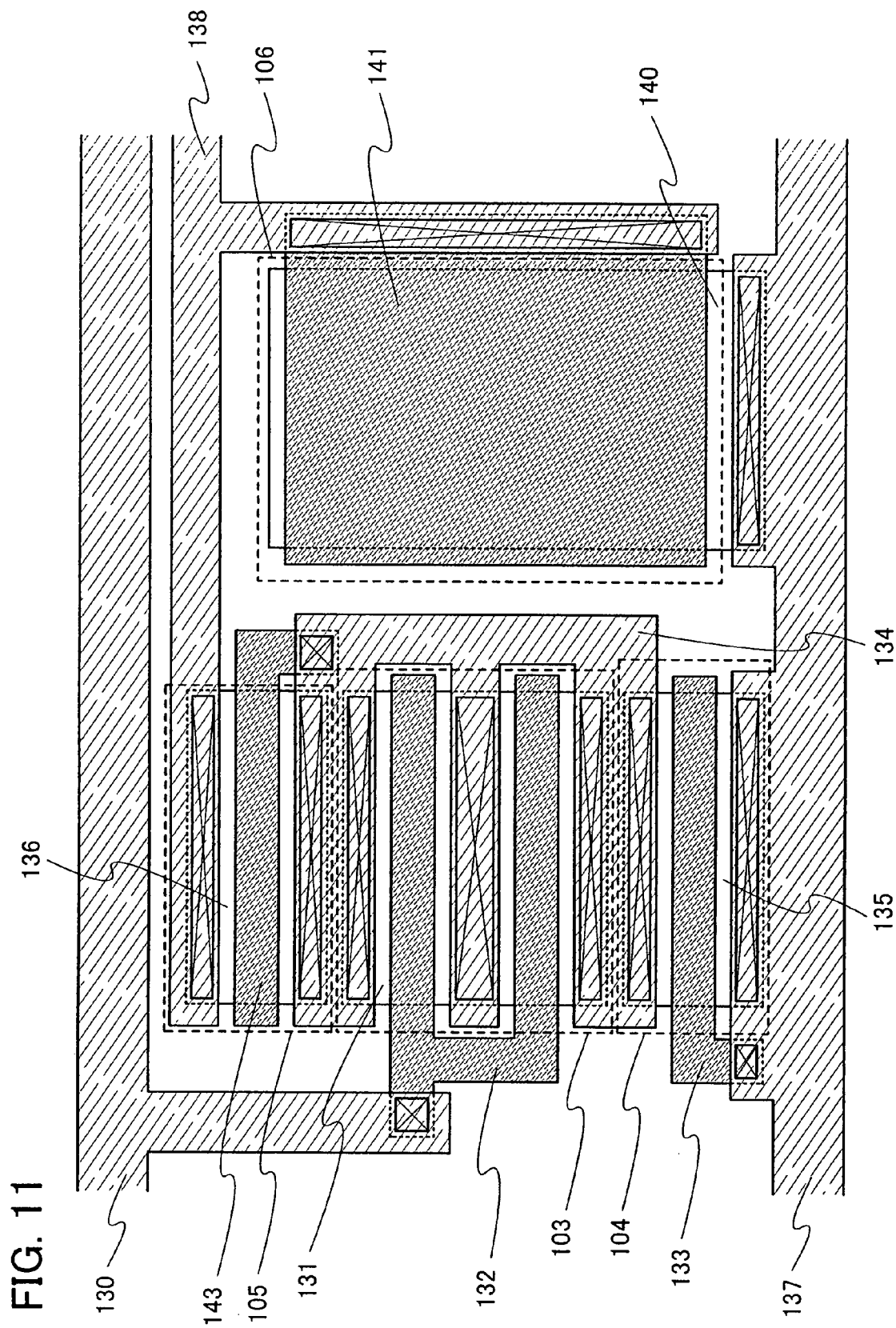
FIG. 11 is a top plan view of a rectifier circuit of the present invention.

FIG. 11 shows a top plan view of the rectifier circuit of the present invention. In FIG. 11, reference numerals 103, 104, 105, and 106 refer to a variable capacitor, a diode, a diode, a smoothing capacitor, respectively. In FIG. 11, a p-channel MOS varactor is used as the variable capacitor 103. In addition, n-channel transistors are used as the diodes 104 and 105.

A potential of the input terminal A1 is fed to a conductive film 130. In addition, the conductive film 130 is connected to a conductive film 132. Part of the conductive film 132 functions as a first electrode of a MOS varactor used as the variable capacitor 103. Impurity regions of the semiconductor film 131 included in the variable capacitor 103 function as second electrodes of the MOS varactor and all of them are connected to the conductive film 134.

A potential of the input terminal A2 is fed to a conductive film 137, and a potential of the conductive film 137 is fed to a circuit of a next stage as a potential of an output terminal OUT2. The conductive film 137 is connected to a source region of the semiconductor film 135 included in the diode 104. Part of the conductive film 133 functions as a gate electrode of the diode 104 and are connected to the conductive film 137. A drain region of the semiconductor film 135 included in the diode 104 is connected to the conductive film 134.

Part of the conductive film 143 functions as a gate electrode of the diode 105 and is connected to the conductive film 134. A source region of the semiconductor film 136 included in the diode 105 is connected to the conductive film 134. A drain region of the semiconductor film 136 included in the diode 105 is connected to the conductive film 138. A potential of the conductive film 138 is fed to a circuit of a next stage as a potential of the output terminal OUT1.

A semiconductor film 140 included in the smoothing capacitor 106 overlaps the conductive film 141 with a gate insulating film interposed therebetween. The conductive film 141 is connected to the conductive film 138, and the semiconductor film 140 is connected to the conductive film 137. A region where the semiconductor film 140 and the conductive film 141 overlaps with each other with the gate insulating film interposed therebetween functions as the smoothing capacitor 106.

Note that in the diode 104, the drain region of the semiconductor film 135 functions as a cathode, and the source region thereof functions as an anode together with the gate electrode. In addition, in the diode 105, the drain region of the semiconductor film 136 functions as a cathode and the source region thereof functions as an anode together with the gate electrode.

The rectifier circuit of the present invention can be formed using a process of a normal thin film transistor. Therefore, the cost spent on manufacturing a rectifier circuit and also a semiconductor device using the rectifier circuit can be reduced.

This application is based on Japanese Patent Application serial no. 2006-274567 filed in Japan Patent Office on Oct. 6, 2006, the entire contents of which are hereby incorporated by reference.

What is claimed is:

1. A rectifier circuit comprising:
    a variable capacitor; and
    a first diode and a second diode for rectifying an inputted AC voltage,
    a first input terminal;
    a second input terminal; and
    an output terminal;
    wherein a capacitance value of the variable capacitor is changed in accordance with an amplitude of the inputted AC voltage,
    wherein the variable capacitor and the first diode are sequentially connected in series between the first input terminal and the output terminal; and wherein the second diode and the first diode are sequentially connected in series between the second input terminal and the output terminal so that forward directions of the first diode and the second diode are the same.

2. A semiconductor device comprising:
the rectifier circuit according to claim 1; and
an antenna,
wherein the antenna is electrically connected to the first input terminal and the second input terminal.

3. The rectifier circuit according to claim 1, wherein the variable capacitor is a p-channel MOS varactor.

4. The rectifier circuit according to claim 1, further comprising:
a capacitor connected in parallel with the first diode and the second diode.

5. A semiconductor device comprising:
the rectifier circuit according to claim 1; and
an antenna,
wherein the inputted AC voltage is an AC electromotive force generated in the antenna.

6. A rectifier circuit comprising:
a variable capacitor;
a first diode and a second diode for rectifying an inputted AC voltage,
a capacitor;
a first input terminal;
a second input terminal; and
an output terminal;
wherein a capacitance value of the variable capacitor is changed in accordance with an amplitude of the inputted AC voltage,
wherein the capacitor and the first diode are sequentially connected in series between the first input terminal and the output terminal,
wherein the second diode and the first diode are sequentially connected in series between the second input terminal and the output terminal so that forward directions of the first diode and the second diode are the same, and
wherein the variable capacitor and the second diode are connected in parallel between the second input terminal and the first diode.

7. The rectifier circuit according to claim 6, wherein the variable capacitor is an n-channel MOS varactor.

8. The rectifier circuit according to claim 6, further comprising:
a resistor connected between the capacitor and the first diode.

9. A semiconductor device comprising:
the rectifier circuit according to claim 6; and
an antenna,
wherein the antenna is electrically connected to the first input terminal and the second input terminal.

10. A semiconductor device comprising:
the rectifier circuit according to claim 6; and
an antenna,
wherein the inputted AC voltage is an AC electromotive force generated in the antenna.

11. A rectifier circuit comprising:
a variable capacitor;
a first diode and a second diode for rectifying an inputted AC voltage,
a third diode;
an input terminal; and
an output terminal;
wherein a capacitance value of the variable capacitor is changed in accordance with an amplitude of the inputted AC voltage,
wherein the variable capacitor and the first diode are sequentially connected in series between the input terminal and the output terminal,
wherein the third diode, the second diode, and the first diode are sequentially connected in series between the input terminal and the output terminal so that forward directions of the first diode, the second diode and the third diode are the same, and
wherein the variable capacitor, the second diode, and the third diode are connected in parallel between the input terminal and the first diode.

12. The rectifier circuit according to claim 11, wherein the variable capacitor is an n-channel MOS varactor.

13. The rectifier circuit according to claim 11, further comprising:
a capacitor connected in parallel with the first diode and the second diode.

14. A semiconductor device comprising:
the rectifier circuit according to claim 11; and
an antenna,
wherein the antenna is electrically connected to the input terminal.

15. A semiconductor device comprising:
the rectifier circuit according to claim 11; and
an antenna,
wherein the inputted AC voltage is an AC electromotive force generated in the antenna.

16. A rectifier circuit comprising:
a variable capacitor;
a first diode and a second diode for rectifying an inputted AC voltage,
a third diode;
a first input terminal;
a second input terminal;
a first output terminal; and
a second output terminal;
wherein a capacitance value of the variable capacitor is changed in accordance with an amplitude of the inputted AC voltage,
wherein the variable capacitor and the first diode are sequentially connected in series between the first input terminal and the first output terminal,
wherein the second diode and the first diode are sequentially connected in series between the second input terminal and the first output terminal so that forward directions of the first diode and the second diode are the same, and
wherein the third diode, the variable capacitor, and the first diode are sequentially connected in series between the second output terminal and the first output terminal so that forward directions of the first diode and the third diode are the same.

17. The rectifier circuit according to claim 16, wherein the variable capacitor is an n-channel MOS varactor.

18. The rectifier circuit according to claim 16, further comprising:
a capacitor connected in parallel with the first diode and the second diode.

19. The rectifier circuit according to claim 16, further comprising:
a capacitor connected between the second diode and the second output terminal.

20. A semiconductor device comprising:
the rectifier circuit according to claim 16; and
an antenna,
wherein the antenna is electrically connected to the first input terminal and the second input terminal.

21. A semiconductor device comprising:
the rectifier circuit according to claim 16; and
an antenna,
wherein the inputted AC voltage is an AC electromotive force generated in the antenna.

22. A rectifier circuit comprising:
a variable capacitor;
a first diode and a second diode for rectifying an inputted AC voltage,
a second variable capacitor;
a third diode;
a fourth diode;
a first input terminal;
a second input terminal; and
an output terminal;
wherein a capacitance value of the variable capacitor is changed in accordance with an amplitude of the inputted AC voltage,
wherein the variable capacitor, the second variable capacitor, and the first diode are sequentially connected in series between the first input terminal and the output terminal,
wherein the variable capacitor, the third diode, the second diode, and the first diode are sequentially connected in series between the first input terminal and the output terminal,
wherein the fourth diode, the third diode, the second diode, and the first diode are sequentially connected in series between the second input terminal and the output terminal so that forward directions of the first diode, the second diode, the third diode and the fourth diode are the same, and
wherein the second variable capacitor, the third diode, and the second diode are connected in parallel between the variable capacitor and the first diode.

23. The rectifier circuit according to claim 22, wherein the variable capacitor and the second variable capacitor are p-channel MOS varactors.

24. The rectifier circuit according to claim 22, further comprising:
a capacitor connected in parallel with the first diode and the second diode.

25. The rectifier circuit according to claim 22, further comprising:
a capacitor connected in parallel with the third diode and the fourth diode.

26. A semiconductor device comprising:
the rectifier circuit according to claim 22; and
an antenna,
wherein the antenna is electrically connected to the first input terminal and the second input terminal.

27. A semiconductor device comprising:
the rectifier circuit according to claim 22; and
an antenna,
wherein the inputted AC voltage is an AC electromotive force generated in the antenna.

28. A rectifier circuit comprising:
a variable capacitor;
a first diode and a second diode for rectifying an inputted AC voltage,
a second variable capacitor;
a third diode;
a fourth diode;
a first input terminal;
a second input terminal;
a first output terminal; and
a second output terminal,
wherein a capacitance value of the variable capacitor is changed in accordance with an amplitude of the inputted AC voltage,
wherein the second variable capacitor and the first diode are sequentially connected in series between the first input terminal and the first output terminal,
wherein the fourth diode, the third diode, the second diode, and the first diode are sequentially connected in series between the second output terminal and the first output terminal so that forward directions of the first diode, the second diode, the third diode and the fourth diode are the same,
wherein the variable capacitor and the second variable capacitor which are sequentially connected in series are connected in parallel with the third diode and the second diode, and
wherein the second diode and the first diode are sequentially connected in series between the second input terminal and the first output terminal.

29. The rectifier circuit according to claim 28, wherein the variable capacitor and the second variable capacitor are p-channel MOS varactors.

30. The rectifier circuit according to claim 28, further comprising:
a capacitor connected in parallel with the first diode and the second diode.

31. The rectifier circuit according to claim 28, further comprising:
a capacitor connected in parallel with the third diode and the fourth diode.

32. A semiconductor device comprising:
the rectifier circuit according to claim 28; and
an antenna,
wherein the antenna is electrically connected to the first input terminal and the second input terminal.

33. A semiconductor device comprising:
the rectifier circuit according to claim 28; and
an antenna,
wherein the inputted AC voltage is an AC electromotive force generated in the antenna.

* * * * *